Nov. 10, 1964  W. H. BEHRENS ETAL  3,156,170
PLACING PLASTIC PAVING MATERIAL
Filed May 11, 1960  5 Sheets-Sheet 1

INVENTORS
WILLIAM H. BEHRENS
MICHAEL I. HUDIS
HILTON L. NEAL
ANTON E. ARNOSTI
ROBERT A. FRICKE
By W. D. O'Connor Atty.

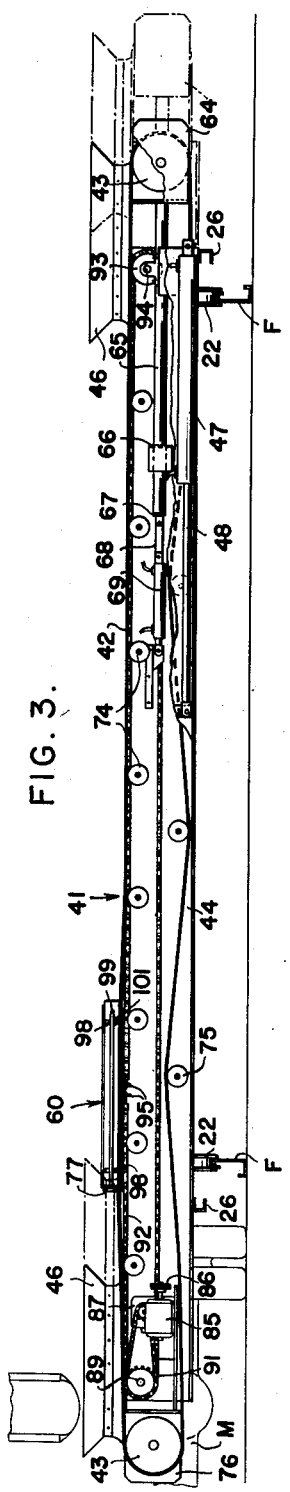
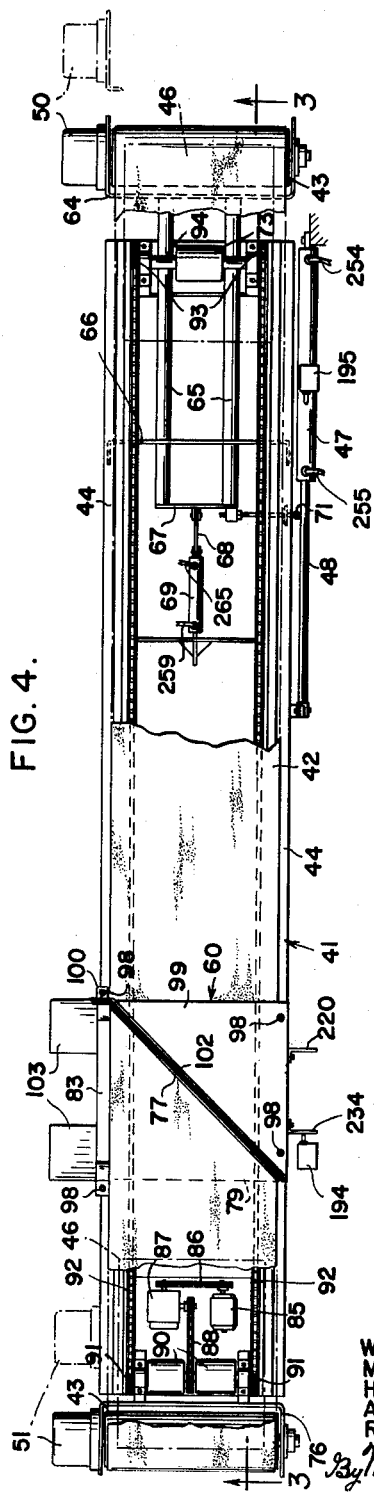
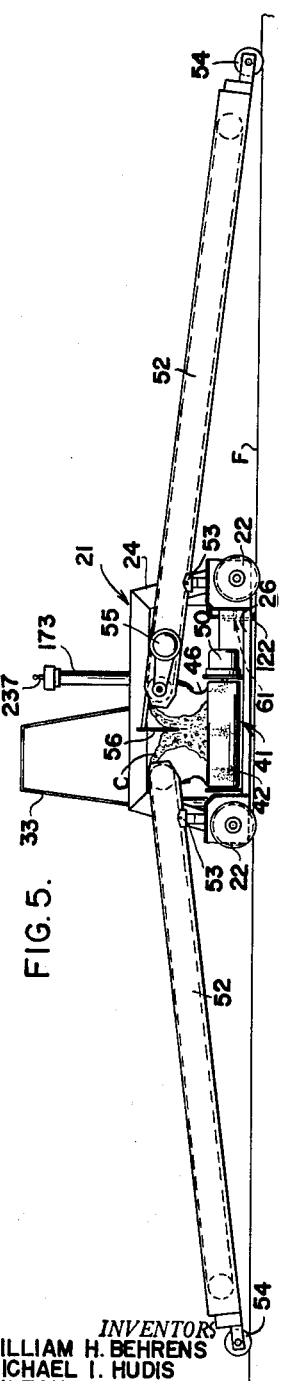

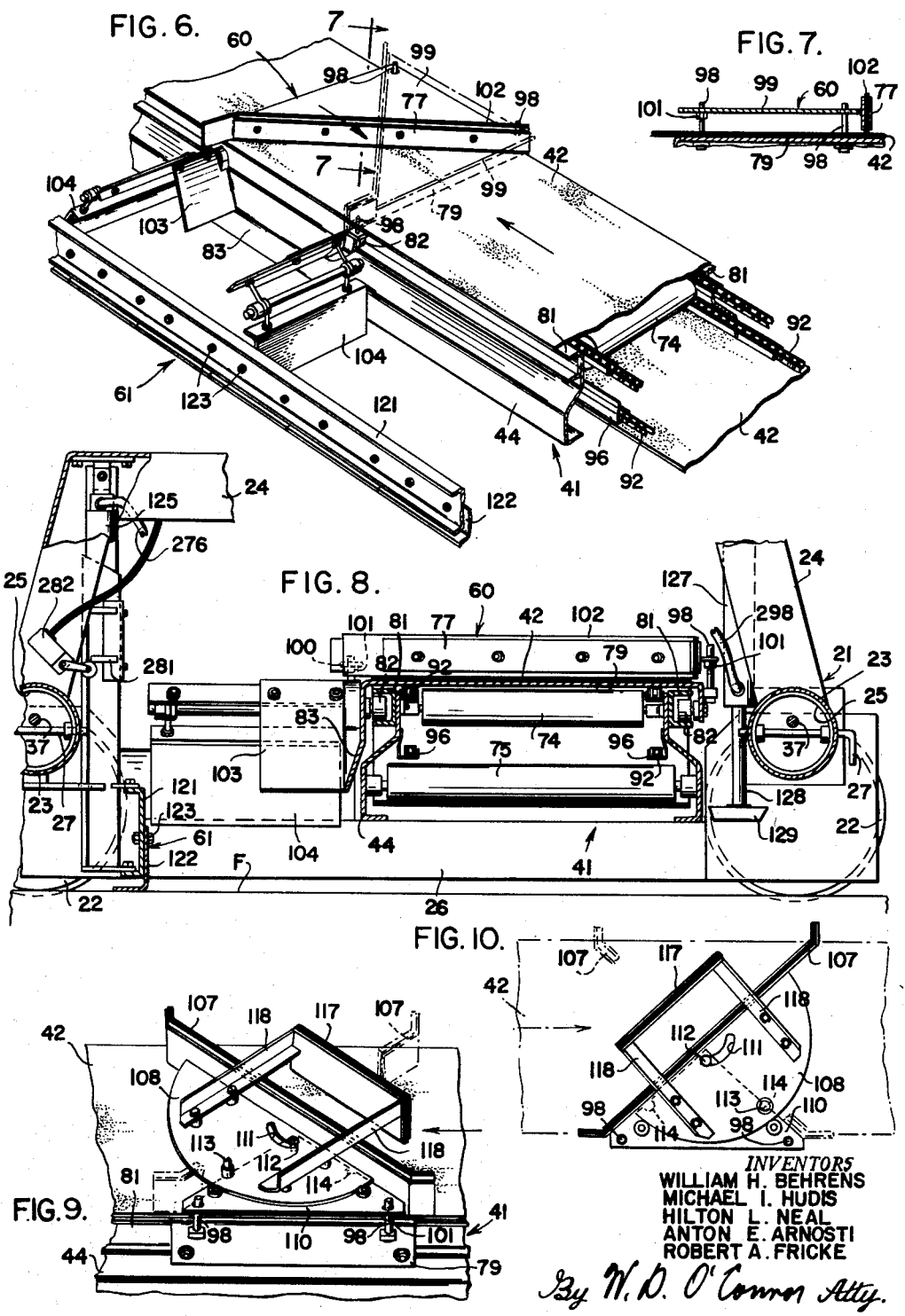

INVENTORS
WILLIAM H. BEHRENS
MICHAEL I. HUDIS
HILTON L. NEAL
ANTON E. ARNOSTI
ROBERT A. FRICKE
By W. D. O'Connor Atty.

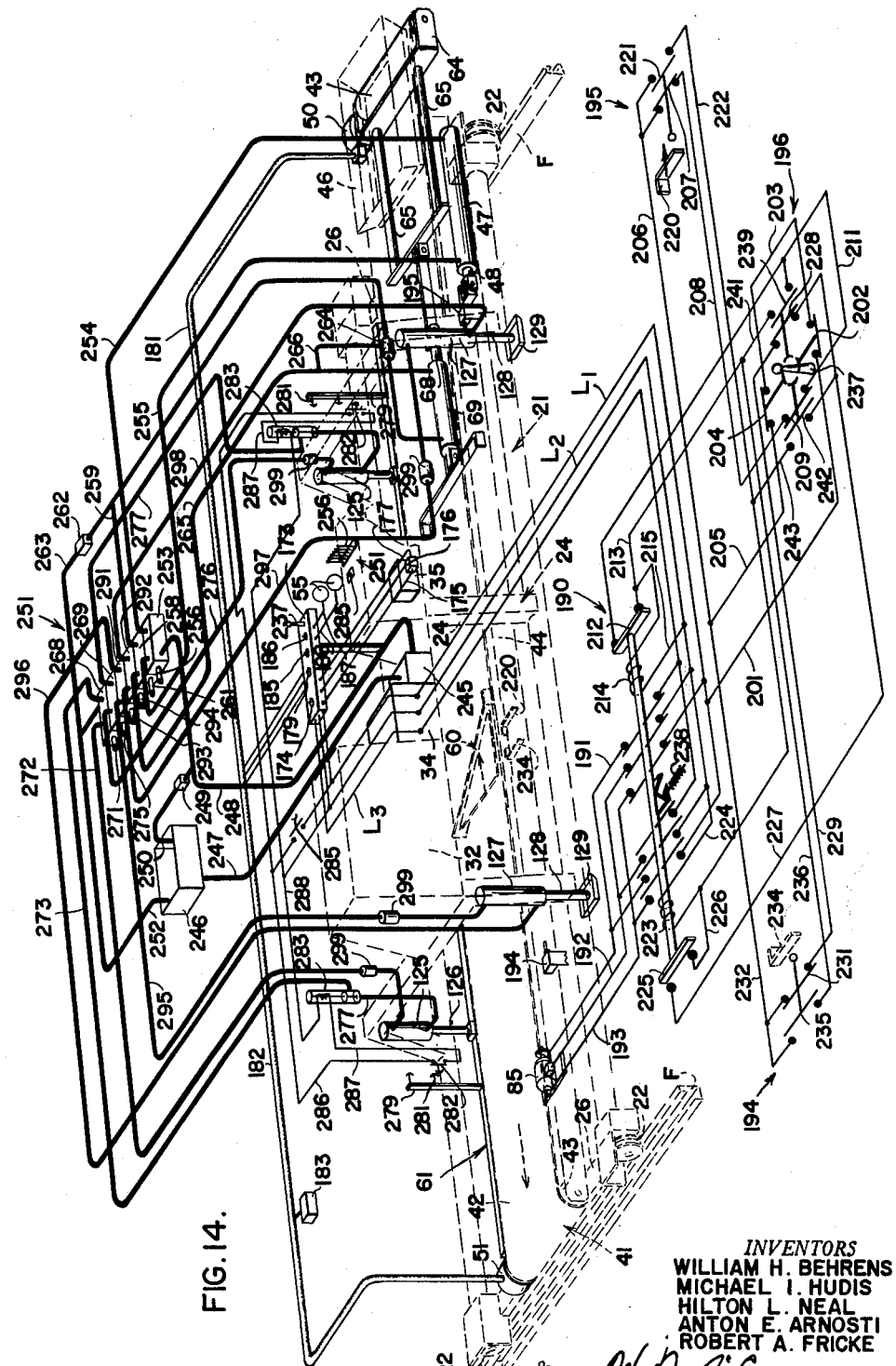

3,156,170
PLACING PLASTIC PAVING MATERIAL
William H. Behrens, Racine, Michael I. Hudis, Brookfield, and Hilton L. Neal, Anton E. Arnosti, and Robert A. Fricke, Milwaukee, Wis., assignors to Chain Belt Company, Milwaukee, Wis., a corporation of Wisconsin
Filed May 11, 1960, Ser. No. 28,395
17 Claims. (Cl. 94—46)

This invention relates, generally, to the placing of paving material in plastic condition and more particularly to a new method of and improved apparatus for placing and spreading plastic material in the forming of pavement slabs.

In placing plastic material such as concrete to form structural elements, it is desirable to move the freshly mixed material to its final position as promptly as possible and with a minimum of disturbance of its constituent ingredients. This is to ensure that the proper proportions of the mixture will be maintained throughout all parts of the structure in order that the resultant concrete, when cured, may be uniform and of maximum strength. To attain high strength in the structure, the plastic concrete when placed must be in a relatively dry condition containing very little more water than that required for the chemical reaction involved in the setting of the concrete. With the plastic material in the form of an optimum stiff or dry mixture, the difficulties involved in accomplishing proper placement of the concrete to form the structural element are considerably increased. In the placing and spreading of plastic concrete to form a slab for a highway or airport pavement, the proper handling of the newly mixed material requires that it be positioned on the site being paved without unduly disturbing the mixture either by working it excessively, dropping it, or otherwise moving it about in any manner that might cause segregation between the aggregate constituents of the material.

In the paving of highways, airport runways, and similar surfaces, the paving material is ordinarily laid in a long, relatively narrow slab or lane upon a carefully graded and prepared surface. The first step in the paving process consists in placing the freshly prepared material in plastic condition upon the previously graded surface and then spreading it thereon to the required thickness as the slab is formed progressively. This spreading operation was originally performed manually by means of shovels or other hand tools, but machines of one type or another have been substituted quite generally for manual spreading, particularly since it has been found that the most satisfactory pavements result from concrete mixes of stiff consistency containing little excess water and which are therefore especially difficult to distribute manually.

It is accordingly, a general object of the present invention to provide improved new apparatus for placing paving material in plastic condition to form a pavement slab.

Another object of this invention is to provide an improved pavement laying machine of the spreader type for distributing paving material in plastic condition to form a slab of pavement.

Another object of the invention is to provide an improved concrete placing and spreading machine in which the plastic concrete is conveyed in a stream transversely of the site being paved and the stream is diverted intermittently to deposit successive transverse strips at the leading end of the slab being laid.

Another object is to provide an improved concrete spreading machine having a movable transverse conveyer that may be extended at either side of the machine for receiving concrete from either side of the site being paved.

Another object is to provide a concrete placing machine including a frame arranged to move along the site being paved and a belt conveyor mounted on the frame transversely of the site with the conveyer arranged to be moved bodily endwise to extend beyond the site at either side thereof for receiving the plastic concrete.

Another object is to provide a machine for placing concrete to form a slab in which a conveyor belt carrying plastic concrete operates continuously across the slab as the machine advances and a cooperating plow reciprocates across the slab in a manner to plow the plastic concrete from the belt on to the site intermittently to form successive transverse strips at the leading end of the slab.

Another object is to provide a concrete spreader having a conveyor that may be operated in either direction to convey concrete over a site being paved and that is provided with a cooperating reversible plow adapted to plow concrete from the conveyer regardless of its direction of operation.

A further object of the invention is to provide a concrete spreader having a strike-off member for smoothing the top of the slab of newly laid concrete and that is provided with power operated means for establishing its vertical position to control the thickness of the slab, the power operated means serving also as a jack to effect lifting of the machine when required.

According to this invention, a long slab or layer of pavement is formed continuously by depositing at its leading end, a series of successive transverse strips of plastic paving material in overlapping integrated relationship and then smoothing the surface to form the slab progressively of the required thickness. This is accomplished by causing a stream of the plastic material to flow transversely across the slab site and intermittently diverting the stream of material by plowing it periodically in direction opposite to its direction of flow to form the successive overlapping strips. To this end, the plastic material is carried upon a conveyer of the belt type movably mounted in a machine frame that is arranged to advance along the site being paved. The conveyer structure carries a cooperating plow and the combination constitutes a self-contained unit that is mounted for movement on the machine frame in such a manner that an end thereof may be projected at either side of the machine to receive the plastic material from the corresponding side of the site. Both the belt and the plow are arranged for operation in either direction and the plow carries distributing elements that serve to level the material as it is deposited. Automatic reversing means are provided at each end of the travel of the plow to cause it to reciprocate continuously in diverting successively strips of material from the belt as the machine advances along the slab. A strike-off member at the trailing end of the machine smooths the top of the slab to a uniform thickness, the thickness of the slab being determined by adjusting the vertical position of the strike-off member. The vertical adjustment of the strike-off member is effected by power and the power adjusting means serves also as a jack in cooperating with other jacks to lift the entire placing machine whenever necessary, such as to position its transportation wheels for moving the machine from one job site to another.

The foregoing and other objects will become more fully apparent from the following description of pavement laying machines constituting exemplary embodiments of the invention, when perused in conjunction with the accompanying drawings thereof, wherein:

FIG. 3 is a view in section through the conveyor of the machine, taken transversely of the supporting forms on the plane represented by the line 3—3 in FIG. 4 to show the internal operating mechanism and including also parts of a vehicle positioned to discharge plastic concrete onto the conveyor.

FIG. 4 is a plan view of the transverse distributing conveyer unit shown on the machine in FIG. 1 and in section in FIG. 3, parts having been broken away to show the operating mechanism;

FIG. 5 is a view in side elevation of the machine, taken from the side opposite that shown in FIG. 2 and illustrating auxiliary feeding conveyers arranged to deliver plastic concrete to the distributing belt conveyer;

FIG. 6 is a fragmentary view in perspective of part of the distributing conveyor together with the reversible cooperating plow and the following strike-off member, the reversed position of the plow being indicated in broken lines;

FIG. 7 is a detailed view in section through the plow blade, taken on the plane represented by the line 7—7 in FIG. 6;

FIG. 8 is an enlarged view in section through the placing machine, taken longitudinally of the supporting forms on the plane represented by the line 8—8 in FIG. 1, some parts having been broken away;

FIG. 9 is a fragmentary view in perspective of part of the concrete distributing conveyor together with a modified plow structure that is reversible by pivoting movement to the position indicated in broken lines;

FIG. 10 is a diagrammatic plan view of the modified reversing plow structure of FIG. 9 with the plow blades shown in the other position, their reversed position being indicated in broken lines;

Figure 13:
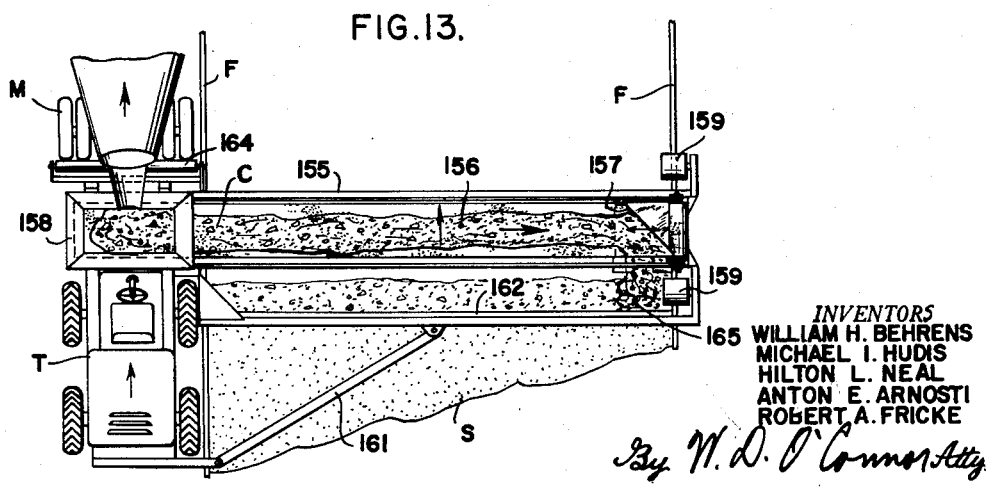

FIG. 13 is a schematic plan view of another modified form of the concrete placing machine showing also part of a vehicle in position to deliver concrete to the conveyer; and FIG. 14 is a schematic circuit diagram of the electrical and hydraulic control systems for actuating the operating elements of the improved concrete spreader, parts of the machine structure being indicated in phantom perspective.

The different figures of the drawings illustrate several embodiments of the present invention, all adapted to place plastic paving material in position to form a paving slab by flowing the material in a continuous stream transversely of the site being paved and intermittently diverting the material from the stream onto the site by plowing the flowing stream against its direction of flow while continuously advancing the flowing stream along the site. The diverted material is deposited thereby on the site in a succession of overlapping transverse strips that are integrated into the advancing leading end of the slab, the surface then being smoothed to form the slab of the required thickness.

This is accomplished in the various embodiments by carrying the plastic material over the slab site on a continuously advancing conveyer of the belt type and diverting the material from the belt by means of a plow that reciprocates along the belt and that engages and plows the material while moving in the direction opposite to the direction of movement of the belt. As the conveyer advances, a following adjustable strike-off member smooths the surface of the deposited material to establish the thickness of the slab being laid.

Figure 1:
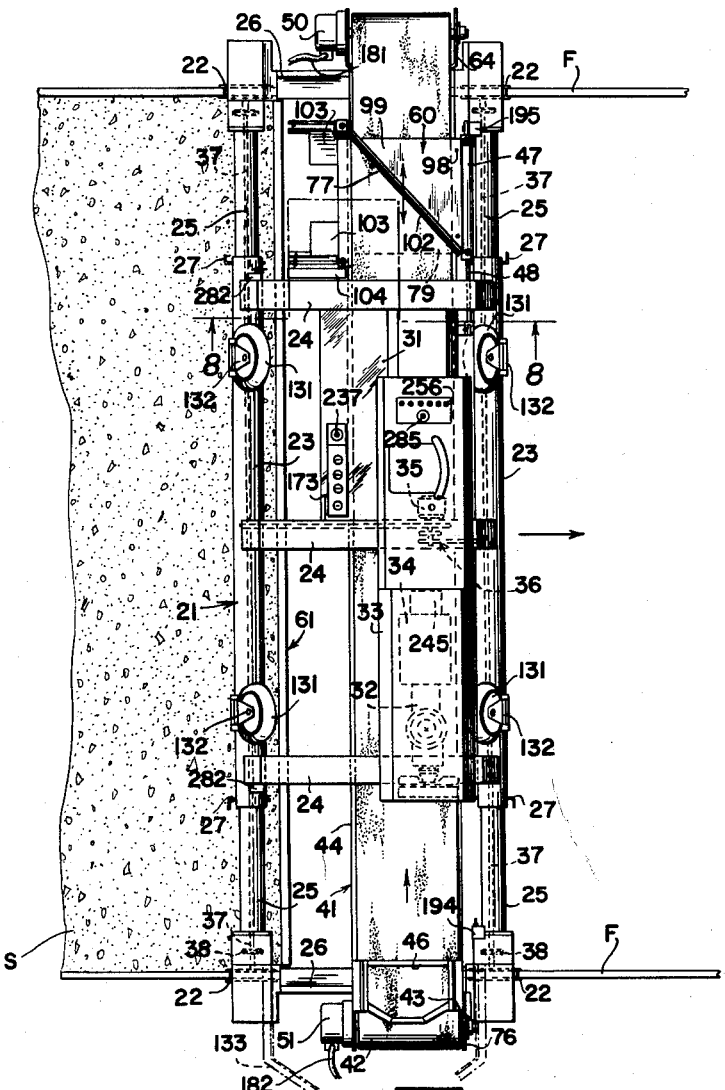
FIGURE 1 is a plan view of an improved concrete placing and spreading machine embodying the present invention, the machine being shown mounted for operation upon forms that define the sides of a pavement slab being laid.
Figure 2:
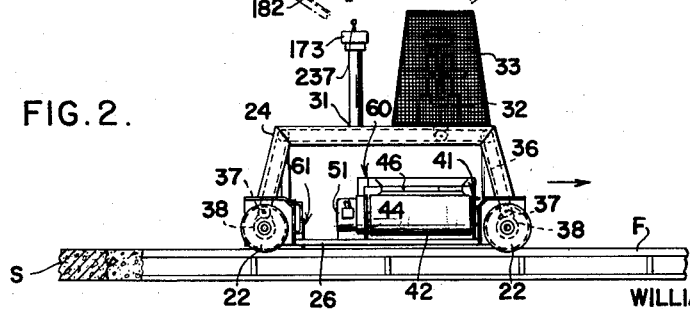
FIG. 2 is a view in side elevation of the concrete placing machine shown in FIG. 1, parts of the supporting forms having been broken away to reveal the concrete slab.

Referring now more specifically to the drawings and particularly to FIGS. 1 and 2 thereof, the operating embodiment of the improved material placing and spreading machine there shown as illustrating the presently preferred or best mode contemplated of practicing the invention, comprises essentially, a main frame 21 that is adapted to extend transversely over and to move along the site of the pavement slab being laid. As appears in FIG. 1, the frame 21 is of generally rectangular shape and is supported for movement along the site by running gear which in this instance is in the form of four flanged wheels 22 arranged at the respective corners of the machine. As shown, the wheels are in position to run along the tops of side forms F which constitute rails in addition to defining the respective sides of a slab S of concrete or the like that may be a highway or runway pavement being placed by the machine.

The main frame 21 is made up of front and rear transverse tubular members 23 that are interconnected by three arched cross support members 24, two positioned at the respective ends of the tubular members and one intermediately thereof, to form a rigid rectangular unit. Each of the tubular main frame members 23 has telescoped within each end thereof an extension tubular transverse member 25. The two extension tubular members 25 at each side of the machine are connected at their outer ends to the respective ends of a low bolster or side member 26 each of which carries at each end one of the flanged wheels 22 that run in tandem on the forms F. As shown in the drawing, the bolsters or side members 26 are disposed directly above and close to the tops of the forms F. Because of the telescoping relationship between the main tubular members 23 and the extension members 25, the frame 21 of the machine may be made wider or narrower to position the side members 26 and wheels 22 in a manner to accommodate the machine to the spacing between the forms F for the particular width of the slab S being laid. In the machine structure illustrated in the drawing, the main frame 21 is thereby made adjustable to operate on forms for laying slabs between twenty and twenty five feet in width, although it is to be understood that the machine may be made to fit wider or narrower form spacings. If desired, power operated apparatus may be provided for moving the extension members 25 in and out of the fixed frame tubular members 23 in a well known manner employed for power widening of other pavement laying machines. When in adjusted position, the extension members 25 may be locked to the fixed frame members 23 in any suitable manner, the particular arrangement shown being in the form of locking pins 27 that extend through aligned holes in both the tubular members 23 and the telescoping extension members 25.

The interconnecting arched bridges or cross members 24 support an operating deck 31 which carries a driving engine 32 that is enclosed within a protective housing 33. The driving engine 32 is directly connected to drive an electric generator 34 that serves to transmit power to the various driven elements of the machine. For advancing the machine along the pavement site as the plastic paving material is placed, there is provided an electric traction motor 35 which is electrically connected to be driven from the generator 34. As appears in FIGS. 1 and 2, the motor 35 is operatively connected through transmission mechanism to drive chain and sprocket mechanisms 36 housed within the intermediate arch or bridge member 24 that in turn drive long extensible transverse shafts 37 rotatably mounted within the tubular frame members 23 and 25. At their respective outer ends, the shafts 37 are connected through speed reducing mechanisms 38 to drive the respective flanged wheels 22 that carry the machine on the forms F. Instead of the single electric traction motor 35 connected through mechanical driving apparatus to the four wheels 22, arrangements may be made to provide a separate driving motor for each driven wheel or for each pair of wheels, the several motors being operated in unison from the generator 34 through appropriate control apparatus.

Supported upon the low bolsters or side members 26 at the sides of the machine and extending transversely of the site being paved, is a conveyer structure 41 for conveying paving material in plastic condition, such as plastic concrete C, transversely of the site between the forms F. As shown, the conveyer structure 41 is an independent unitary beam or girder element somewhat longer than the slab width, that extends parallel with and between the tubular main frame members 23 and 25 and beneath the arched cross members 24 with its end portions resting in sliding relationship on the low side frame members or bolsters 26. The conveyer structure 41 includes a conveyer belt 42 that in this particular machine is about three feet wide and thirty feet long and that operates over end pulleys or drums 43 at the opposite ends of the conveyer. The two end pulleys 43 are rotatably mounted at the respective ends of a frame formed by spaced girders 44 that are constituted by channel side plate members of generally Z shape as shown in FIG. 8 and that are interconnected to form a bridging girder or gantry structure which is slidably mounted on the side bolsters 26.

As shown in the drawing, each end of the conveyer structure 41 is provided with a receiving hopper 46 through which plastic concrete C may be fed onto the belt 42, the arrangement being such that the plastic concrete may be delivered to the placing machine from either side of the slab site as circumstances may dictate. For this purpose, an end of the conveyer 41 may be extended from either side of the machine by sliding the entire beam structure lengthwise on the bolsters 26, as indicated in broken lines in FIGS. 3 and 4. Since the belt carrying conveyer structure 41 is of fixed length, the amount by which it may happen to extend beyond or overhang the side bolsters 26 at either or both sides of the slab will depend upon the adjusted width of the machine to accommodate the width of the particular slab being laid.

Movement of the conveyer structure 41 endwise relative to the machine frame 21 is preferably effected by power such as through operation of a hydraulic cylinder 47 mounted at one end on one of the side bolsters 26 and that is provided at its other end with a piston rod 48 connected at its outer end to one side girder 44 of the conveyer frame, as shown in FIGS. 1, 3 and 4. By this arrangement, it is convenient to withdraw the extending end of the conveyer 41 to permit a vehicle, such as a transit mixer M, indicated in FIG. 3, to pass by near the machine along the edge or shoulder of the slab site after which the conveyer may be extended behind the vehicle to receive plastic concrete discharged from it into the receiving hopper 46.

As appears in the drawings, the end pulleys 43 are provided respectively with driving motors 50 and 51 each connected through suitable speed reducing gearing to turn the pulleys 43 at the desired speed, both of the motors being driven from the generator 34 through control apparatus and flexible cables. Although both belt pulleys 43 are shown equipped with driving motors whereby the belt 42 may be driven by means of both motors in either direction with equal facility, it is to be understood that the conveyer may be operated by either motor individually or that it may be driven in the usual manner if desired by means of only a single motor on one or the other of the belt pulleys 43. Since the belt 42 may be driven in either direction, the loading of the belt may be effected alternately from opposite sides of the site when the circumstances are such as to make this desirable. By this arrangement, the conveyer may be extended from the machine at one side of the site with the upper strand of the belt running inwardly to place material being discharged from a vehicle positioned at that side and then the conveyer may be projected from the other side of the machine with the motors 50 and 51 reversed to drive the belt in the other direction for conveying inwardly plastic concrete C delivered from a vehicle at this other side of the site. In this manner, while one vehicle is being unloaded at one side of the machine, another vehicle may be brought into position for unloading at the other side of the machine, whereby the plastic concrete may be supplied alternately to the opposite ends of the conveyer 41 in a substantially continuous stream.

Another arrangement for providing a continuous supply of concrete to the conveyer 41 is shown in FIG. 5 which is a view taken from one side of the slab being laid. As there shown, the machine may be provided with extension or wing feeder conveyers 52, the wing conveyers being pivotally mounted by means of king pin supporting arrangements 53 on the respective ends of the adjacent bolster 26, with their discharge ends in position to feed plastic concrete into the hopper 46 at that end of the conveyer 41. The other or outer ends of the wing feeders 52 are each supported by means of a single flanged wheel 54 that runs on the adjacent form F. By this arrangement the wing feeders 52 travel with the machine along the forms F as the machine advances in placing the concrete.

Since the feeders 52 extend longitudinally of the forms F, a vehicle such as a transit mixer standing at the side of the slab site, may discharge plastic concrete onto the wing feeder at any position therealong from end to end thereof thus making it possible for a vehicle to discharge from a stationary position onto a wing feeder as the feeder and the machine progresses along the forms F. With two wing feeders as shown in FIG. 5, two vehicles may be discharged alternately or simultaneously in order to maintain a continuous flow of concrete C onto the machine conveyer 41. The wing feeder conveyers 52 may be employed individually or in pairs as shown, at either or both sides of the placing machine for delivering plastic concrete C to the ends of the main conveyer 41 in the manner best suited to the circumstances of operation.

Each wing conveyer 52 is essentially a belt conveyer similar to but narrower and shorter than the main belt conveyer 42, the belt being in this instance about two feet wide and twenty-two feet long. A driving motor 55 is provided for driving each wing conveyer belt through suitable reduction gearing, the motors being electrically connected by controllers and flexible cables to be driven from the generator 34. One or both of the wing conveyers may be provided at its discharge end with a deflecting hood or plate 56 that confines and guides the stream of plastic concrete C onto the main conveyer 41.

As previously mentioned, the stream of plastic concrete C being carried transversely of the slab site on the conveyer belt 42 is intercepted and diverted from the belt onto the slab site by means of a plow 60 that plows the concrete from the belt while traveling along the conveyer structure 41 in the direction opposite to the direction in which the stream of concrete C is being conveyed by the belt. The plow 60 is power driven to reciprocate automatically along the conveyer 41 in such a manner that upon each of its working strokes or excursions it plows from the belt and deposits upon the pavement site, a transverse strip of plastic concrete C that is added to and integrated with the advancing end or leading edge of the pavement slab being laid. In this manner, the plastic concrete is placed accurately very nearly at its final position with very little disturbance of the mixture by unnecessary movement and working thereof.

The successive overlapping strips of plastic concrete C thus deposited are then smoothed and leveled to form the slab S of the desired thickness, by means of a following strike-off member 61 that is adjustably carried by the main frame 21 parallel with and adjacent to the trailing tubular frame member 23. The strike-off member 61 is adjustable vertically to regulate the thickness of the course of concrete being laid and although it is shown as being of the plain or fixed type, it is to be understood that it can be arranged for endwise movement to constitute an oscillating screed or for vertical movement to form a tamper element, as may be found preferable in preparing the surface of the slab for the subsequent smoothing operations that complete the finished pavement. Furthermore, the strike-off member 61 may be vibrated if desired in any well known manner to assist in compacting and smoothing the slab.

As best shown in FIGS. 3 and 4, the belt carrying pulley or drum 43 at the right end of the conveyer 41 is arranged in a subframe for outward movement relative to the conveyer structure frame members 44 in order to tighten the belt 42. As there shown, the pulley 43 is rotatably mounted in a yoke or bracket 64 which is in turn carried on the outer ends of a pair of spaced arms or rams 65 that are slidably mounted somewhat loosely in cross members 66 which interconnect the spaced side channels 44 constituting the frame of the conveyer structure 41. The arms or rams 65 are in the form of hollow tubes or pipes and are connected at their inner ends by a header 67 to which is connected a piston rod 68 extending from a hydraulic cylinder 69 which operates to exert pressure outwardly upon the rams 65 to tighten the belt 42.

A belt aligning screw mechanism 71 is connected between one of the side channels 44 and the ram header 67 and operates when turned to effect limited canting or pivoting of the loosely mounted rams in the cross members 66 thereby to tilt the drum 43 slightly in a manner to effect proper tracking of the belt 42 in running over the drums. A relatively large idler pulley 73 is rotatably supported upon the cross member 66 between the rams 65 in position to support the upper run of the belt beneath the material receiving hopper 46. Inwardly from the hopper 46, a series of spaced idler rollers 74 of smaller diameter are rotatably mounted between the upper edges of the respective side channels 44 for supporting the upper run of the belt throughout the length of the conveyer. Other similar idlers 75 carry the lower or return run of the belt 42 in a well known manner. The belt pulley 43 at the other end of the conveyer is likewise rotatably mounted in a similar yoke or bracket 76 which in this case is secured directly to the end of the conveyer framework.

As best shown in FIGS. 6 and 8, the material deflecting plow structure 60 includes a reversible double edged straight plowing blade 77 that rests or floats upon the upper surface of the belt 42 and is loosely connected at its ends with a driving carriage that operates along the conveyer side channels 44 beneath the upper run of the belt 42. As best shown in FIG. 8, the plow driving carriage comprises a horizontal backing plate 79 of generally square shape in plan with down turned ends and that extends across the conveyer frame just beneath the upper run of the belt 42 to support it and maintain it level for cooperation with the floating plow blade 77. The side members 44 of the conveyer frame are reinforced at their top edges by outwardly faced channels 81 which serve as tracks or raceways for carriage wheels 82 that are rotatably mounted on the inner sides of the down turned ends of the backing plate 79 at its respective corners to constitute the plow carriage running gear. At the discharge side of the conveyer, the down turned end of the backing plate 79 is extended to constitute a depending protective apron 83 that serves to guide the downward flow of the plastic concrete that is deflected from the belt 42 by the plow blade 77.

Power for driving the plow 60 along the conveyer 41 is derived from an electric motor 85 mounted in the left end of the conveyer frame, as seen in FIGS. 3 and 4, and that is electrically connected through flexible cables to be driven by the generator 34. The motor 85 operates through belts 86 to drive a speed reducing mechanism 87 which in turn operates a chain drive 88 to turn a shaft 89 at relatively slow speed. The shaft 89 extends between and is rotatably mounted in the side frame members 44 of the conveyer structure and serves also to support a pair of large idler rollers 90 that rotate thereon and support the upper run of the belt 42 beneath the material receiving hopper 46 at that end of the conveyer. Near each end, the shaft 89 has fixed to it, a sprocket 91 which drives a long chain 92 connected to actuate the plow carriage 60. The two chains 92 extend from the sprockets 91 at the respective ends of the shaft 89 along each side frame member 44 to the other end of the conveyer where they are trained around idler sprockets 93 rotatably mounted on the end portions of a transverse shaft 94 which also carries the large belt supporting idler pulley 73 beneath the hopper 46 at that end of the frame. As shown in FIG. 3, the two ends of each chain strand 92 are connected to the plow carriage beneath the backing plate 79 by means of chain tightening devices 95 whereby the respective chains may be tightened for proper operation about the sprockets 91 and 93. As shown in FIG. 8, the chains 92 are supported by and operate within light channel members 96 constituting trough guiding elements that are secured to the inner surfaces of the side plates 44 forming the conveyer main frame. By this arrangement the plow 60 may be caused to reciprocate along the conveyer structure 41 by operating the driving motor 85 in the one or the other direction alternately as required.

As shown in FIGS. 6, 7, and 8, the backing plate 79 constituting the body of the plow carriage, is provided near its respective corners and outwardly of the belt edges with upstanding pins or posts 98 which engage and drive the floating plow blade 77 along the belt 42. As appears in FIG. 6, the blade 77 is disposed at an angle of about forty-five degrees to the axis of the belt 42 and is provided along the midplane of its trailing face with a supporting and stiffening plate 99 of generally triangular shape. At the leading end of the plow blade 77, the stiffening plate 99 is provided with spaced openings that loosely receive the two driving pins 98 extending upwardly from the end of the backing plate 79 at that side of the belt 42. At its trailing end, the plate 77 is provided with a rearwardly extending lug 100 presenting an opening that loosely receives one of the pins 98 extending upward from the other end of the backing plate 79. Stop members 101 are provided on the pins 98 to limit the downward movement of the plate 99 in order to hold it in a substantially horizontal position as shown in FIG. 7, the plow blade 77 being thus held vertically with its lower edge resting upon the surface of the belt 42.

As shown in FIGS. 6 and 7, the plow blade 77 has extending from both its top and bottom edges, a wiping element 102 preferably of rubber or the like, that operates as a squeegee in deflecting the stream of plastic concrete C from the surface of the belt 42. When the plow blade 77 is in the position shown in full lines in FIG. 6, it is adapted to be moved toward the right, as indicated by the arrow, to plow the plastic concrete C from the belt 42 that is then moving toward the left. If now, it should be desired to feed the concrete onto the belt at the other end of the conveyer 41, the direction of movement of the belt is necessarily reversed and the position of the plow blade 77 must likewise be reversed to adapt it for plowing in the other direction. This is accomplished by simply lifting the plow blade and its reinforcing plate 99 as a unit from the three driving posts 98 and turning it other side up in direction endwise of the belt to the reversed position indicated in broken lines in FIG. 6. In this position, the respective openings in the plate 99 at the leading end of the blade 77 engage the opposite ones of the two driving posts 98 at that side of the belt while the opening in the lug 100 at the trailing end of the blade engages the other post 98 at the apron or discharge side of the backing plate 79. Since the blade 77 and the wiping element 102 are symmetrical about the plane of the reinforcing plate 99, the other edge of the wiping element 102 then engages the belt 42 with floating action in the same manner for plowing the stream of plastic concrete from the belt surface but in the other direction of movement.

As shown in FIGS. 6 and 8, the depending apron 83 at the discharge side of the backing plate 79 is provided near its ends with outwardly extending and downwardly converging guide plates 103 to form therewith a discharge chute or tremie for guiding the plastic concrete C flowing from the plow blade 77 down the apron 83 onto the site of placement. Pivotally suspended behind each of the guide plates 103 is a swinging spreader or kicker plate 104. As shown in FIG. 6, the pivotal or hinged connection of each spreader plate 104 is limited in such a manner that the trailing plate swings upward and is dragged along the surface of the stream of concrete that slides down the apron 83 between the guide plates 103 from the plow and is deposited in overlapping relationship with the previously deposited strip. On the other hand, the leading or forward spreader plate 104 swings downward to the vertical position to engage some of the previously deposited concrete in a manner to move it transversely toward the side form F to fill in the edge of the slab at positions that may be beyond the reach of the guiding chute formed by the guide plates 103. On the return stroke the leading spreader plate moves some of the material toward the other side form F in the same manner. In this manner the successive overlapping strips deposited from the belt 42 are given a preliminary smoothing treatment as they lie in the trough formed between the trailing side plate 44 of the conveyer structure 41 and the following strike-off member 61, by reason of the action of the hinged spreader plates 104, as the plow 60 reciprocates across the slab site.

By this arrangement, the conveyer structure 41 and cooperating plow 60 constitute a unitary self-contained concrete placing apparatus that is quite independent of and is movable with respect to other elements of the concrete spreading machine. As previously mentioned, and as may be seen in FIG. 8, the side plate members 44 of the conveyer structure merely rest upon the low bolsters 26 at the respective ends of the machine and are slidable thereon for extending an end of the conveyer at either side of the machine selectively. Since the driving motors for both the belt 42 and the plow 60 are mounted on the movable unitary conveyer structure 41, the electrical connections to them are effected through flexible cables to provide for maintaining the supply of power from the generator 34 on the main frame of the machine.

In FIGS. 9 and 10 of the drawing, there is shown a modified form of the plow structure for diverting the plastic concrete from the belt 42. As there shown, the modified plow includes a main plow blade 107 that is generally similar to the plow blade 77 shown in FIG. 6. As shown, the main plow blade 107 is disposed at substantially forty-five degrees to the conveyer belt 42 and is arranged to be pivoted about a vertical axis at the center of the belt to swing through ninety degrees for reversing its position when the direction of movement of the belt is reversed. In this instance, the blade 107 is provided on its trailing side with a reinforcing and supporting plate or web 108 that is semi-circular in shape. The plate 108 is rotatably mounted for pivotal movement about a vertical axis through its geometrical center that is disposed above the apex of a supporting plate 110 of generally triangular shape. The base of the triangular supporting plate 110 overhangs the edge of the belt 42 and is connected with and supported upon the driving pins 98 extending upward from the downturned end of the backing plate 79.

An arcuate slot 111 is formed in the plate 108 near its center to receive a pivot or stop pin 112 extending upward from the triangular supporting plate 110. The arcuate slot 111 extends through ninety degrees and cooperates with the stop pin 112 to guide and to limit the extent of pivoting movement of the blade 107 between its two operating positions, as shown in FIGS. 9 and 10. A vertical locking pin 113 is slidably mounted in the plate 108 in a manner to be engaged with either of two locking notches 114 at the respective edges of the triangular supporting plate 110. To change the position of the blade 107, the locking pin 113 may be lifted to disengage it from one of the notches 114 whereupon the blade 107 and its backing plate 108 may be pivoted about the central vertical axis. When the blade 107 has been turned through ninety degrees, the locking pin 113 will drop into the other notch 114 to lock the plate in its new position for plowing in the other direction.

The modified reversing plow shown in FIGS. 9 and 10 has in addition to the main diverting blade 107, a short auxiliary blade 117 that operates in advance of the main blade 107. As shown, the auxiliary blade 117 is about half as long as the main blade 107 and is held in operating position ahead of the main blade by means of a pair of angle iron struts 118 that extend over the top of the main blade and are secured back of it to the backing plate 108 whereby the preliminary blade 117 is held rigidly to move with the main blade when it is shifted from one operating position to the other. When in operation, the preliminary blade 117 diverts somewhat more than half of the stream of plastic concrete C from the belt 42 while the main blade 107 removes the remaining concrete and cleans the surface of the belt.

The auxiliary blade 117 also performs an additional function in that it provides for power reversal of the position of the plow. Since the blade 117 engages only the part of the belt 42 at the rearward side of the central pivot axis, the frictional drag of the belt on the blade 117 exerts a moment tending to rotate the plow structure about its pivot axis. Accordingly, when it is desired to reverse the position of the plow, the locking pin 113 may be lifted from the notch 114 to unlock the plate 108, whereupon the frictional dragging action of the belt on the auxiliary blade 117 will swing the plow to its other position in which it is locked by the pin 113 engaging with the other notch 114 at the other side of the supporting plate 110. The direction of movement of the belt 42 may then be reversed to convey concrete from the other end of the conveyer 41 with the plow blades 107 and 117 then in position to engage and divert the stream of material onto the pavement site from the reversed direction.

As best shown in FIGS. 6 and 8, the strike-off member 61 that effects smoothing of the surface of the plastic concrete deposited in front of it by the plow 60, comprises essentially a transverse single channel member 121 that extends from side to side of the slab S. Along its lower edge, the channel member 121 carries a series of relatively short angle bars 122 that constitute adjustable shoes engaging the surface of the concrete and that are readily replaceable in the event of wear. These angle bar elements 122 are adjustably secured to the channel 121 by bolts 123 operating in slots in such a manner that the independent strike-off shoe elements 122 may be positioned to conform to a desired crowned contour for forming a curved surface on the slab.

As previously mentioned, the strike-off member 61 is bodily adjustable in the vertical direction to establish the depth or thickness of the concrete slab being laid by the machine. Thus, if it is desired to lay the slab in two courses with reinforcing mesh between them, the strike-off member 61 is first set at a position somewhat below the tops of the forms F in order that the machine may be operated along the forms in a manner to lay the first course. After the reinforcing mesh is placed on the first course, the machine is again run along the forms F with the strike-off member 61 set at its high position, which is ordinarily substantially in line with the tops of the forms to lay the second or top course for completing the slab of the required thickness with its upper surface smoothed and shaped to the desired contour.

For moving the strike-off member 61 vertically to establish its position for striking off the top of a course of concrete, there is provided power operated lifting mechanism including two hydraulic cylinders 125 that are mounted respectively in the rearward legs of the two arched cross members 24 adjacent to the ends of the trailing main frame member 23. Piston rods 126 extending downward from the cylinders 125 are secured at their lower ends to the strike-off channel member 121 whereby the channel member may be moved downward or upward by means of pressure fluid admitted to the cylinders 125.

In addition to positioning the strike-off member 61 vertically, the cylinders 125 also function as lifting jacks to assist in lifting the entire machine through exerting force downward upon the strike-off member 61 when it is in contact with the ground. A similar pair of hydraulic cylinders 127 are mounted in the forward legs of the same arched cross members 24 near the respective ends of the leading main frame tubular member 23. The forward cylinders 127 are provided with piston rods 128, the lower ends of which carry ground-engaging shoes 129. By operating these front cylinders 127 in conjunction with the strike-off adjusting cylinders 125, the entire concrete placing machine may be lifted or jacked up to an elevated position.

As shown in FIG. 1, the machine may be provided with four rubber tired transportation wheels 131 that are carried by brackets 132 which encircle and are clamped or locked to the tubular main frame elements 23 adjacent to their respective ends. With the machine operating on the forms as shown in FIG. 1, the transportation wheels 131 are clamped in their upper inactive positions, as shown. When it is desired to transport the machine to another job site, for example, the entire machine is jacked up by means of the hydraulic cylinders 125 and 127 whereupon the brackets 132 are unclamped and the wheels 131 are swung downward into road engaging position beneath the main frame members 23. The brackets 132 are then clamped to the tubular members 23 again and the machine then may be lowered by operation of the cylinder 125 and 127 to engage the wheels 131 with the ground. A towing tongue 133 may be attached to the bolster 26 at one side of the machine whereby the machine may be drawn along a highway behind a truck or tractor. Although four transportation wheels are shown in the drawing, it may be desirable in transporting the machine to use only two wheels, particularly if the towing tongue structure is of the fifth wheel type that is pivotally connected to a towing tractor.

When the machine is brought to a new site of operation, it is maneuvered into place between the Forms F on its transportation wheels 131 and adjusted for width to position its flanged wheels 22 directly above the respective side forms F. The machine is then jacked up by means of the hydraulic cylinders 125 and 127 whereupon the brackets 132 are unclamped and the transportation wheels 131 are swung up and clamped in their inactive positions, as shown in FIG. 1. The hydraulic cylinders 125 and 127 are then operated to lower the machine to engage the flanged wheels 22 with the tops of the forms F. With the machine properly placed on the forms F, the vertical position of the strike off member 61 is adjusted by means of the cylinders 125 to form a course of concrete of the desired thickness and the other necessary adjustments are effected to place the machine in condition for operation in spreading the plastic concrete upon the site being paved, as previously described.

Figure 11:
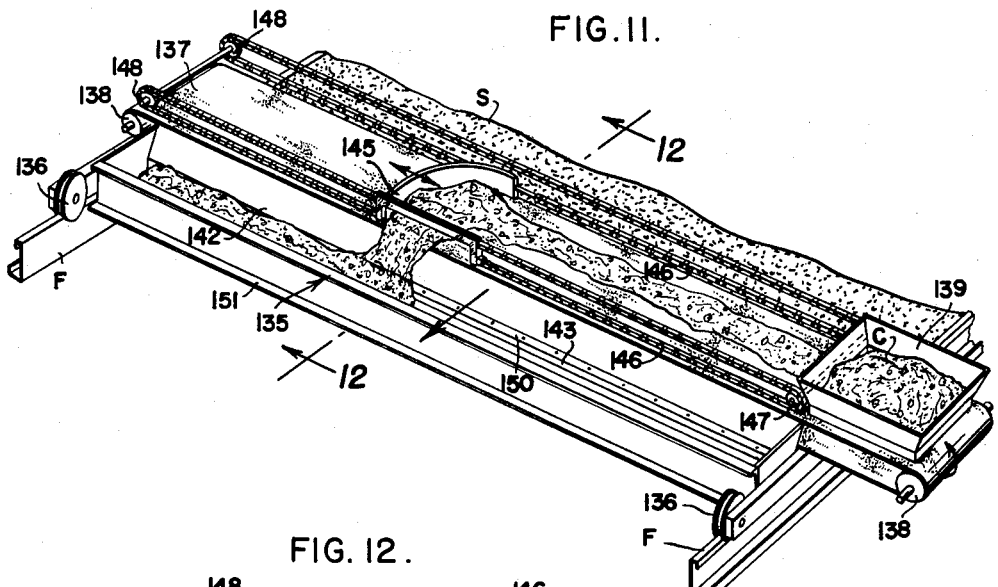
FIG. 11 is a largely schematic view in perspective showing a somewhat modified form of the improved concrete placing machine.
Figure 12:
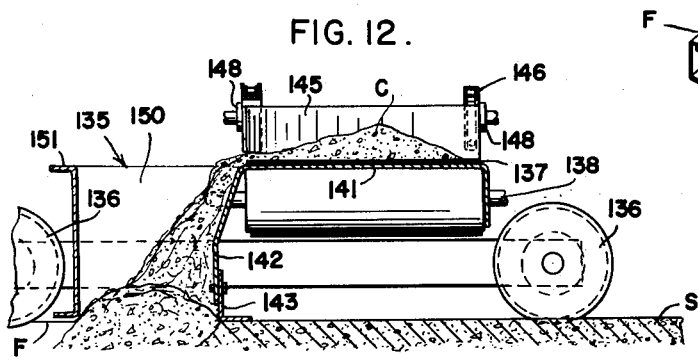
FIG. 12 is a view in section through the modified placing machine, taken on the plane represented by the line 12—12 in FIG. 11.

A modified version of the improved concrete placer and spreader for laying pavement slabs is shown somewhat schematically in FIGS. 11 and 12 of the drawing. As there shown, the machine comprises a main frame 135 of generally rectangular shape that is supported on the forms F by running gear constituted by flanged wheels 136 disposed at the respective corners of the frame. A conveyer belt 137 is operatively supported on the frame 135 by means of end pulleys or drums 138, the conveyor being extended to the right beyond one side form F as shown in FIG. 11 in position to receive the plastic concrete C that may be fed to it through a cooperating relatively large hopper 139 from the near side of the slab site. In this modification as shown schematically, the frame 135 is indicated as being of fixed width and the conveyor belt 137 is shown as mounted on the frame to extend in a fixed position at one side of the machine, although it is to be understood that the frame 135 may be made adjustable to accommodate it to the width of the slab S being laid and that the conveyer belt 137 may be made adjustable relative to the frame 135 in a manner generally similar to the arrangement previously set forth in connection with the placing machine illustrated more in detail in FIGS. 1 to 10 of the drawing.

The modified machine shown in FIGS. 11 and 12 differs from the previously described machine primarily in that the stream of plastic concrete C is deflected from the conveyer belt 137 in the forward direction, that is, over the leading edge of the belt rather than over the trailing edge thereof, as previously shown. In this construction, the upper run of the conveyer belt 137 is supported throughout it length by a continuous backing plate 141 that is secured to the frame 135 and extends from side to side of the machine transversely of the site being paved. The continuous backing plate 141 is provided at its forward or leading edge with a coextensive depending continuous apron 142 down which the deflected plastic material may slide from the belt onto the site being paved. As best shown in FIG. 12, the depending apron 142 is provided along its lower edge with adjustable strike-off elements or shoes 143 that may be generally similar to the segmental strike-off elements 122 shown in FIGS. 6 and 8. The strike-off elements 143 may be adjusted to establish the elevation of the top surface of the slab S being laid and also to establish a curved contour on the surface when crowning of the pavement slab is desired, as previously explained. Although the fixed backing plate 141 is shown as being flat to support the belt 137 in a level horizontal position, its upper surface may be made concave in order that the belt may be troughed to carry a larger quantity of the plastic paving material.

As in the previously described machine, the plastic material is deflected from the belt 137 onto the pavement site by means of a plow 145 that reciprocates along the belt 137 and effects the diverting operation when moving in the direction opposite to the flow of material carried on the belt. The plow 145 is shown as having a flat lower surface to engage the flat belt, but it is to be understood that if the belt is troughed, the plow will be correspondingly shaped.

Since the backing plate 141 is, in this instance, continuous and stationary, the plow 145 and its driving mechanism are disposed entirely above the belt 137. As shown in FIG. 11, the plow 145 is pulled along the belt 137 by means of two chains or cables 146 disposed above the respective edges of the belt and running over cooperating sprockets or pulleys 147 adjacent to the loading hopper 139. The two sprockets or pulleys 147 may be power driven in the manner of the sprockets 91 shown in FIGS. 3 and 4 or in any other suitable way in order to pull the plow 145 along the belt as in the previously described machine.

The plastic concrete C may be fed to the belt 137 through the large receiving hopper 139 in such a manner that it is carried by the belt in a continuous stream across the site being paved, the flowing stream of plastic concrete being diverted from the belt 137 by the plow 145 in moving along the belt in direction opposite to the direction of movement of the belt and its stream of concrete, as previously explained. This results in depositing the plastic concrete upon the site in the form of a strip extending transversely thereof along the leading edge of the slab. When the plow 145 arrives at the end of its diverting excursion which is in the region of the receiving hopper 139 at the end of the belt, the direction of the movement of the plow is reversed, whereupon it then returns to the other or remote end of the belt 137 without effecting any plowing action upon the plastic concrete during the return trip. If desired, this return motion of the plow 145 may be effected simply by permitting the plow to be carried along by the belt to the remote end of the conveyer in which case the pulling cables or chains 146 may be single strands wound upon power driven drums that operate to reel in or pay out the cables or chains to effect reciprocation of the plow. On the other hand, the plow 145 may be retracted in its return stroke by means of return strands of the cables or chains 146 which are shown looped about idler pulleys or sprockets 148 at the remote end of the conveyor in the same manner that the chains 92 are trained about the idler sprockets 93 in the previously described machine. The concrete engaging blade of the plow 145 in this instance is shown as being curved or arcuate in shape as distinguished from the straight blade used in the plow of the previously described machine.

As best shown in FIG. 12, the plastic concrete that is deflected from the belt 137 by the plow 145 slides down the apron 142 progressively into a trough-like chamber or compartment 150 formed between the apron 142 and a forwardly spaced transverse channel member 151 that constitutes the leading or front transverse element of the machine frame 135. The strip of plastic material in the trough 150 is engaged and overridden by the strike-off members 143 at the bottom of the apron 142 as the machine advances along the forms F and is smoothed and shaped thereby to define the top surface of the slab S. The rate of advance of the machine along the forms F, is preferably regulated in a manner to maintain the depth of the plastic concrete C in the trough 150 substantially constant. That is, the machine's speed is such as to maintain sufficient concrete ahead of the strike-off 143 to insure that the slab S will be formed of the proper depth while at the same time the machine advances at a rate fast enough to utilize the successive strips of plastic material as rapidly as they are deposited in the trough 150 from the belt 137.

Although the lower edge of the strike-off member 143 that overrides and forms the surface of the slab S is shown as being relatively narrow, if desired, it can be made wider to constitute a relatively wide smoothing plate, say of width about equal to that of the belt 137. Such a wide smoothing plate may be deflected in a well known manner for curving it to shape and smooth the surface of the slab S to the required crowned contour.

Another modified version of the placing and spreading machine is shown schematically in FIG. 13. The machine there shown in plan view is particularly adapted for the laying of relatively narrow pavement slabs and may therefore be of somewhat lighter construction. This machine comprises a frame 155 that extends transversely of the pavement slab S being laid between the side forms F in a manner generally similar to the previously described machine. The machine frame 155 supports a conveyer unit including a belt 156 and a cooperating plow 157 that operates along the belt 156 to deflect plastic material therefrom as previously explained. The distributing conveyer unit constituted by the belt 156 and the plow 157 may be generally similar in construction to the previously described transverse conveyer shown in FIGS. 3 and 4 or to the modified conveyer shown in FIGS. 11 and 12.

The arrangement shown in FIG. 13 differs from the previously set forth machines primarily in that the overhanging end of the conveyer frame 155 that is provided with a receiving hopper 158 is supported exteriorly of the forms upon the front of a tractor T that operates along the shoulder or other adjacent surface just outwardly of the form F at the near side of the slab site. That is, the distributor is supported independently of the form F at the receiving hopper end of the conveyer 156 while the outer distal end of the frame 155 is provided with a pair of relatively wide rollers 159 that are arranged in tandem relationship to roll on the top of the form F at the far side of the slab site. An angular brace or strut 161 is connected from the frame 155 in the region of the middle of the slab site to the rear part of the tractor T to assist in pushing the frame 155 along the outer form F. A cooperating strike-off member 162 is carried by the frame 155 at its trailing end and when pushed along by the strut 161, operates as previously described to level the concrete C that is deflected from the belt 156 by the plow 157.

The tractor T is provided with an electric generator by means of which energy is transmitted from the tractor engine to drive the belt 156 and the cooperating plow 157 electrically in the manner previously explained. At its forward end, beyond the hopper 158 at the end of the frame 155, the tractor carries a pusher roller 164 that is arranged to engage and push against the rear tires of a vehicle such as a transit mixer M, indicated in the drawing. As the transit mixer M is pushed ahead of the Tractor T it discharges freshly mixed concrete in plastic condition into the receiving hopper 158 from which it is carried in a stream by the belt 156 and is plowed from the belt intermittently by the plow 157 to form transverse strips on the site, as previously described. In the arrangement shown in FIG. 13, the plastic concrete C is plowed rearwardly from the belt 156 into a trough 165 just ahead of the strike-off member 162. The tractor T is operated at the proper speed to effect smoothing of the top of the slab S by the strike-off member 162 as fast as the successive strips of plastic material are deposited in the trough 165 by operation of the plow 157.

When it is desired to move the apparatus to another job site, for instance, the brace 161 is removed and the frame 155 is detached from the tractor T. The entire frame may then be lifted and moved to the left from the position shown in FIG. 13, a sufficient distance to balance it on the front of the tractor T. The tractor may then be driven to the new job site whereupon the frame 155 is pushed to the right far enough to engage the rollers 159 with the outer form F and the frame may thereupon be fastened to the tractor T as before, to prepare it for operation. The rollers 159 are preferably of sufficient width to maintain rolling contact with the top of the outer form F in spite of the fact that the path of movement of the tractor T may deviate somewhat from a line truly parallel to the forms F when the machine is in operation.

Although the driving apparatus for actuating the various movable elements of the modified versions of the improved concrete placer and spreader has been indicated only diagrammatically in FIGS. 11, 12, and 13, it is to be understood that the actuating mechanisms and controlling systems of these machines may be generally similar to the apparatus for this purpose shown in connection with the preferred embodiment of the invention that is illustrated in detail in FIGS. 1 through 8 of the drawings. As there shown, the principal elements of the driving and controlling mechanism, together with the source of power for the various driven members are indicated in their respective operating positions on the machine structure. Furthermore, the manner in which these power actuated parts cooperate has been explained in connection with the general description of the machine structure and its mode of operation. The description and drawings have indicated that some of the actuating and controlling apparatus is electrical and that some is hydraulic in nature. A more detailed understanding of the specific interconnecting system of electrical conductors and hydraulic pressure conduits to accomplish the prescribed functions of the various machine parts may be had by reference to the control and power circuits illustrated diagrammatically in FIG. 14 of the drawing.

In this schematic diagram, the circuits for controlling and operating the movable elements of the improved placing and spreading machine are schematically illustrated in connection with the general outline or phantom of the machine which is indicated in perspective on the diagram in broken lines. As previously mentioned, electric power for operating and controlling the machine is provided by the generator 34 which is driven by the internal combustion engine 32 and furnishes current of appropriate characteristics, preferably three phase alternating current. From the generator 34, line conductors L1, L2, and L3 lead to a control panel or console 173 that presents a series of electrical control switches in position for convenient manipulation by the machine operator. A switch 174, one of the series of switches on the console 173 may be moved by the operator to establish an electrical connection from the three conductors L1, L2 and L3 to corresponding conductors 175, 176 and 177 leading to the electric traction motor 35 for energizing it to drive the machine along the forms F.

As previously explained, the traction motor 35 is operatively connected by transmission mechanism to drive the four flanged wheels 22 that support the machine at its respective corners on the forms F. In order to control the direction and speed of operation of the machine, the direction of rotation of the motor 35 may be established by actuating a reversing switch which may be incorporated with the switch 174 and, if desired, the speed of operation of the motor may also be varied by electrical control apparatus of well known construction. In the particular machine shown in the drawing however, the motor 35 is preferably of constant speed type and is connected to drive the power transmission mechanism 35 by means of well known speed changing mechanism such as variable pitch cone pulleys and belts, and reversing gearing serving to control both the speed and the direction of operation of the machine. In either case, the driving mechanism may include suitable clutches or brakes for effecting steering of the machine in operating along the forms F. When operating under normal conditions, the speed of movement of the machine along the forms F is ordinarily maintained constant, once the proper speed has been established in relation to the rate at which the paving material is being supplied to the machine. Furthermore, the traction motor 35 indicated in the diagram may be taken as representative of a group of motors that may be connected respectively to drive some or all of the wheels 22 either independently or in pairs as previously mentioned.

Another switch 179 on the console 173 is so arranged that when it is closed by the operator, it effects an electrical connection from the three supply lines L1, L2 and L3 to corresponding electrical conductors incorporated in cables 181 and 182 that lead respectively in opposite directions to the two conveyor driving motors 50 and 51. These two motors each are operatively connected through gearing, as previously explained, to drive the end pulleys 43 at the respective ends of the conveyor 41. The electrical conductors in the cables 181 and 182 are arranged to be disconnected readily and are of flexible material in order that the cables may be flexed to accommodate movement of the motors 50 and 51 when the conveyor structure 41 is shifted bodily relative to the machine frame 21. The conveyor controlling switch 179 may be arranged to provide for reversing the direction of rotation of the motors 50 and 51 simultaneously or a separate reversing switch may be provided in order that the conveyor belt 42 may be operated in either direction to convey inwardly material received at either side of the machine. Arrangements may be provided for varying the speeds of the motors 50 and 51 as required, although it has been found satisfactory to operate the motors at a constant speed, the speed at which the conveyor belt 42 will travel at about two hundred fifty feet per minute having been found to be satisfactory. In order to avoid an excessive voltage drop that otherwise might occur through energizing both motors simultaneously when starting the conveyor 41, a time delay relay 183 is provided in the conductor cable 182 leading to the motor 51. The time delay relay 183 is set to start the second motor 51 shortly after the first motor 50 has been started to drive the belt 42 which will ordinarily occur before the belt receives its load of paving material. Suitable switching and disconnecting arrangements may be provided if desired, for operating the conveyor from one end only by either of the motors 50 or 51 working independently.

Additional switches 185 and 186 are provided on the console 173 for energizing the conductors of other flexible cables 187 and 188 leading respectively to the driving motors 55 on each of the wing conveyors 52. The cables 187 and 188 also are made flexible to provide for positioning the wing conveyors at either side of the machine and they are furthermore arranged to be disconnected readily whenever the wing conveyors are detached from the machine, as may be desirable for instance when the machine is being moved to another job site.

The plow 60 which deflects the plastic concrete from the belt 42 is caused to reciprocate along the conveyor structure 41 by reversing operation of the plow driving motor 85 that is operatively connected to the plow by means of a transmission mechanism including the long chains 92 extending from end to end of the conveyor as previously explained. Power for energizing the motor 85 is derived from the engine-driven generator 34 through the line conductors L1, L2 and L3. As shown in the circuit diagram, the line conductors are connected to a reversing switch or contactor 190 from which conductors 191, 192 and 193 lead to the motor 85. In order to effect the desired reciprocatory motion of the plow 60, the motor 85 is reversed by operation of the reversing switch 190 under the control of limit switches 194 and 195 that are adjustably positioned near the respective ends of the conveyor structure 41 and which are operated by the plow to effect automatic reversal of the plow movement at the ends of its excursion. The limit switches 194 and 195 are movably mounted on the conveyor frame 41 in order that they may be adjusted to effect reversal of the direction of plow movement at precisely the desired positions relative to the conveyor, depending upon the width of the slab S being deposited and other factors.

Starting and stopping of the plow driving motor 85 is effected by means of a manually operated four way toggle switch 196 on the console 173 that also incorporates contacts for effecting reversal of the motor 85. By means of the switch 196, the motor may be reversed with the plow at any position along the conveyor, thereby providing for countermanding or overriding the reversing action of the limit switches 194 and 195. Although the manually controlled toggle switch 196 is mounted on the console 173, the reversing switch 190 may be mounted within the engine housing 33, various of the electrical connections being effected by means of flexible cables as previously explained to provide for relative movement such as adjusting movement of the limit switches and bodily movement of the conveyor 41 in the machine frame.

With the reversing switch 190 in the right hand closed position shown in the circuit diagram, the motor 85 is energized for operation in direction to move the plow 60 to the right, as indicated by the arrow. Electrical energy for the switch controlling circuit is ordinarily at a lower voltage than that of the motor circuit but for simplicity of illustration the control circuit is here shown as being taken directly from line conductors L1 and L2. As shown, a control conductor 201 leads from the line conductor L1 to the manually operated reversing control switch 196 where it connects with a normally closed contact 202 from which a conductor 203 leads to another normally closed contact 204 that is connected by conductor 205 to a conductor 206 leading to the righthand limit switch 195. The conductor 206 is connected to a normally closed contact 207 in the limit switch 195 from which a conductor 208 returns to the manually controlled switch 196 where it connects with a normally closed contact 209. From the contact 209, a conductor 211 leads to an interlocking contact 212 on the motor reversing switch 190. With the reversing switch 190 in the position shown, the locking contact 212 is closed and is connected by a conductor 213 to energize an actuating solenoid coil 214 that holds the reversing switch 190 in its closed position, the coil 214 being connected by a return conductor 215 to the other line conductor L2.

When the plow 60 arrives at the end of its excursion to the right, a stop dog 220 on the plow carriage engages the limit switch 195 in a manner to open the normally closed contact 207 thereby interrupting the control circuit and deenergizing the coil 214 of the switch 190. At the same time, a normally open contact 221 of the limit switch 195 is closed thereby completing a circuit from the energized conductor 206 to a conductor 222 that connects with an actuating solenoid coil 223 at the other end of the reversing switch 190 and which is connected by a return conductor 224 to the line conductor L2. Energization of the solenoid coil 223 causes the reversing switch 190 to move to the left to its other closed position in which the motor 85 is energized to move the plow 60 to the left. This also causes an interlocking contact 225 at the left end of the switch to close thereby establishing a holding circuit that maintains the coil 223 energized when the plow moves to the left away from the limit switch 195 and the reversing contact 221 thereupon reopens. The holding circuit extends from the coil 223 through the conductor 222 and a conductor 226, the holding contact 225 and a conductor 227 leading to a normally closed contact 228 of the manual reversing switch 196. From the contact 228 a conductor 229 leads to a normally closed contact 231 of the left limit switch 194 which is connected by a conductor 232 to the conductor 205 from which the circuit leads through the closed contacts 204 and 202 of the manual switch 196 and thence through the conductor 201 to line conductor L1. The reversing switch 190 is preferably provided with an internal electrical interlock (not shown) that is arranged to prevent simultaneous energization of the two solenoid coils 214 and 223.

When the plow 60 completes its excursion to the left, another stop dog 234 on the plow carriage contacts the left limit switch 194 thereby opening the contact 231 and deenergizing the reversing switch solenoid coil 223. At the same time, a normally open contact 235 of the limit switch 194 is closed momentarily thereby completing a reversing circuit from the energized line 232 through a conductor 236 that leads to the conductor 213 which is connected with the switch actuating coil 214 and energizes it to move the switch to the closed position shown in the drawing in which the plow is moved to the right. This closes the holding circuit contact 212 which maintains the circuit as previously explained after the plow reverses and the contact 235 of the limit switch 194 reopens. From this explanation of the operation of the reversing limit switches 194 and 195, it is apparent that the direction of movement of the plow 60 will be reversed automaticaly at each end of its excursion and that the plow will continue to reciprocate along the conveyor 41 under automatic control as long as may be required.

If now it is desired to stop the plow, it is merely necessary to move a self-centering control handle 237 of the four way manually operated switch 196 to the one side or the other from its central neutral position thereby opening either the one or the other of the normally closed contacts 202 and 204 which are connected in series in the control circuit. This results in deenergizing the control circuit and deenergizes whichever reversing switch coil 214 or 223 happens to be energized at the moment. With the coils 214 and 223 deenergized, the reversing switch 190 is moved to its central or neutral position under control of a spring urged detent 238 thereby disconnecting the motor 85 from the line conductors L1, L2 and L3 to stop the plow 60.

In order to start the plow in movement toward the right as indicated by the arrow, for instance, the manual control lever 237 is tilted in the direction of the required movement, that is to the right as seen in the diagram. This results first in opening the normally closed contact 228 to break the circuit leading to the solenoid 223 at the left end of the reversing switch 190. Further movement of the lever 237 then effects closing of a normally open contact 239 which completes a circuit from the line conductor L1 through the normally closed contacts 202 and 204 of the switch 196, the normally closed contact 207 of the right hand limit switch 195 and the normally closed contact 209 of the switch 196 to a conductor 241 that connects with the conductor 213 leading to the solenoid 214 at the right end of the reversing switch 190. With the solenoid 214 thus energized, the reversing switch is moved to the right hand position shown, thereby energizing the motor 85 to move the plow to the right. The holding contact 212 is then closed to establish the previously described holding circuit through the conductor 211 in shunt relationship with the contact 239 which may then be reopened by releasing the manual control lever 237 to let it return to its central position. The plow 60 may then continue its movement to the right until it engages the limit switch 195 whereupon it will reverse automatically as previously explained.

If it should be desired to reverse the direction of movement of the plow 60 before it engages the limit switch 195 at the right end of its stroke, this may be accomplished by moving the control lever 237 to the left from its central position. When this is done to effect overriding of the automatic reversing system, the normally closed contact 209 is opened thereby deenergizing the solenoid 214. Also, a normally open contact 242 is closed thereby completing a control circuit leading from the line conductor L1 through the normally closed contacts 202 and 204 of the switch 196, the normally closed contact 231 of the left limit switch 194 and the normally closed contact 228 of the switch 196, the closed contact 242 and a conductor 243 that connects with the conductor 222 leading to the solenoid coil 223 at the left end of the reversing switch 190. With the coil 223 energized, the switch 190 is moved to its left closed position whereupon the motor 85 reverses and drives the plow to the left. In this position, the holding contact 225 is closed thereby establishing a holding circuit through the conductor 227 in shunt relationship with the contact 242 to causes the plow to continue moving to the left after the lever 237 is released and returned to its central neutral position.

By this arrangement, it is apparent that the plow 60 can be caused to move in either direction along the conveyer 41 simply by moving the hand control lever 237 in the corresponding direction and regardless of whether the plow is stationary or moving in the opposite direction at the moment. Also, whenever the plow is started in either direction by movement of the hand lever 237, in the corresponding direction, the plow continues to move after the lever 237 is released to its neutral position and the reversing limit switches 194 and 195 then take over the control operations to effect automatic reciprocation of the plow 60 from end to end of the conveyer 41. Furthermore, should it be desired to reverse the direction of movement of the plow 60 at any position intermediate the limit switches, this may be accomplished simply by moving the manual control lever 237 in the direction opposite that in which the plow is then traveling. When the lever 237 is released, the limit switches will again continue the automatic reciprocation of the plow as before and the operation will continue until it is desired to change or stop it. To stop the plow, the lever 237 may be moved sidewise in either direction to open one or the other of the contacts 202 or 204 and deenergize the control circuit thereby returning the reversing switch 199 to its central neutral position as previously explained.

Hydraulic fluid under pressure for operating the hydraulically actuated parts of the machine is provided by a pump 245 that is driven from the shaft of the generator 34 which is in turn directly driven by the engine 32, as indicated diagrammatically in FIG. 14. The fluid is drawn from a supply reservoir 246 through a conduit 247 leading into the pump 245 and is discharged therefrom through a pressure conduit 248. A pressure relief valve 249 is connected with the conduit 248 for relieving excess pressure in the usual manner, the surplus liquid being returned to the reservoir 246 through a return conduit 250. The pressure fluid conduit 248 is connected to one end of a bank 251 of control valves and a return conduit 252 is connected to the other end of the valve bank 251 to conduct exhaust fluid back to the reservoir 246. Although the pressure relief valve 249 is shown separately for clearness in the diagram, it may in practice be more conveniently incorporated within the valve bank 251. Likewise, the pump 245 may be mounted within the reservoir 246 for convenience.

A control valve 253 shown at one end of the bank 251 receives pressure fluid from the conduit 248 and is arranged to effect a connection from the conduit 248 to either a conduit 254 or a conduit 255 selectively upon movement of an associated actuating lever 256 in the one or the other direction from its central neutral position. As shown, the conduit 254 is connected to the right end of the cylinder 47 that operates to shift the conveyer structure 41 endwise relative to the machine frame 21. When pressure is admitted through the conduit 254 to the right end of the cylinder 47, the piston rod 48 is forced outward and shifts the conveyer 41 to the left. Conversely, the conduit 255 is connected to the left end of the cylinder 47 and when pressure is admitted through this conduit, the piston rod 48 and the attached conveyer 41 move to the right to the position shown in the diagram. Accordingly, the position of the conveyer structure 41 relative to the frame 21 may be established as desired simply by manipulating the valve control lever 256 to slide the conveyer 41 over the side bolsters 26 in the one or the other direction selectively as may be required. When the conveyer has been properly positioned, the valve lever 256 is returned to its central neutral position in which the valve 253 operates as a hydraulic lock serving to prevent the escape of liquid from either end of the cylinder 47. With the piston rod 48 thus locked in the cylinder 47, further movement of the conveyer frame relative to the supporting side bolsters is prevented. When the valve actuating lever 256 is in its central neutral position, the valve 253 is positioned to permit the pressure fluid to flow through it freely and return to the reservoir 246 through the return conduit 252. If it is desired to provide for effecting power widening of the machine frame 21, additional control valves and additional cylinders similar to the conveyer shifting cylinder 47 may be provided to move the telescoping extension members 25 relative to the frame members 23 in like manner.

A control valve 258 shown adjacent to the valve 253 in the bank 251, also receives pressure fluid from the conduit 248 but after it flows through the valve 253. From the control valve 258, a conduit 259 leads to the closed end of the belt tensioning cylinder 69. When an actuating lever 261 of the valve 258 is moved in the appropirate direction, fluid pressure is admitted through the conduit 259 into the cylinder 69 thereby forcing the piston rod 68 to the right as seen in the drawing and exerting force through the rams 65 to move the belt pulley 43 to the right thereby tightening the belt 42. In order that the force exerted to tighten the belt 42 may not be excessive, the conduit 259 has connected to it, an adjustable pressure relieving valve 262 that serves to limit the total force exerted on the belt to an amount depending upon the pressure provided through adjustment of the relief valve. A return conduit 263 leads from the relief valve 262 to the conduit 252 leading to the reservoir 246 for returning excess hydraulic fluid to the reservoir.

In order to lock the piston rod 68 positively in the cylinder 69 to maintain the belt in its tightened condition, there is provided in the pressure conduit 259 an hydraulic locking valve 264 in the form of a pilot operated check valve that permits the pressure fluid to flow freely into the closed end of the cylinder 69 but acts as a releasable check valve to prevent any return flow until the valve is released. Thus, after the valve actuating lever 261 has been moved to admit belt tightening pressure fluid that passes through the check valve 264 and enters the cylinder 69, the fluid is prevented from returning through the releasible check valve 264 even though the lever 261 is returned to neutral position and the pressure is no longer applied to the pressure line 259. In order to retract the rams 65 and the belt pulleys 43, to loosen the belt, the valve lever 261 is moved in the other direction thereby admitting pressure to a conduit 265 which leads to the rod end of the cylinder 69. When pressure is exerted through the conduits 265, it tends to retract the piston rod 68 into the cylinder, but in order to do so, it is first necessary to release the fluid trapped in the closed end of the cylinder 69 by the check valve 264. This is accomplished by action of the retracting fluid pressure which passes from the conduit 265 through a branch conduit 266 that leads to the pilot operated check valve 264 and operates thereon to open it in a manner to permit the fluid in the closed end of the cylinder 69 to exhaust through the conduit 259 into the valve 258 and thence through the return conduit 252 leading to the reservoir 246. By this arrangement, the belt may be tightened to the predetermined degree of tension whereupon it is locked in the tightened position by fluid trapped in the cylinder 69 by the check valve 264, until such time as the valve 264 is released by operation of pressure admitted through the valve 259 to retract the tensioning rams 65.

At the other end of the valve bank 251 there are two valves 268 and 269 that control the elevation of the strike-off screed 61. These valves also both receive pressure fluid that flows into the valve bank 251, from the pressure conduit 248. As indicated in the drawing, the valve 268 is provided with an actuating lever 271 by actuation of which pressure fluid may be admitted into a conduit 272 that leads to the closed upper end of the screed adjusting cylinder 125 shown near the left side of the machine, to force the piston rod 126 and the left end of the strike-off member 61 downward. By moving the lever 271 in the other direction, pressure fluid may be admitted to a conduit 273 that leads to the lower or rod end of the cylinder 125 for exerting pressure to lift that end of the strike-off member 61. In a similar manner, the second valve 269 is provided with an actuating lever 275 that may be operated in one direction to admit pressure fluid to a conduit 276 that leads to the upper end of the cylinder 125 at the other or right end of the strike-off member 61 has shown in the drawing. Likewise, upon moving the lever 275 in the other direction, pressure fluid may be admitted to a conduit 277 that leads to the lower end of the right hand cylinder 125.

As previously mentioned, when laying a pavement slab, the concrete is sometimes laid in two courses with re-enforcing mesh between them. For convenience in positioning the strike-off member 61 to strike off the different concrete courses at predetermined levels, there is provided near each end of the strike-off 61 an upstanding bracket 279 that carries vertically adjustable stop dogs 281. As shown in FIG. 8, the stop dogs 281 are each arranged to cooperate with a normally open stop switch 282 that is mounted in a fixed position on the arched cross member 24 adjacent to the cylinder 125 at each side of the machine. The arrangement of the stop switches 282 and stop dogs 281 is such that when the strike-off member 61 is moved up or down by manipulating the control levers 271 and 275, each end of the strike-off may be stopped automatically at a selected precisely predetermined position by engagement of the associated adjustable stop dog 281 with its stationary switch 282.

With the lower stop dogs 281 in the adjusted positions shown, the strike-off member 61 may be positioned automatically by them to strike off the top of a pavement slab substantially even with the tops of the side defining forms F. To this end, each lower stop dog 281 is adjusted precisely on its bracket 279 to control exact positioning of its associated end of the strike-off member 61. If now it should be desired to lay the first course of a two course slab at a lower level for example, the stop dogs 281 that are in the upper adjusted positions are utilized to stop the movement whereupon the strike-off member 61 may be positioned automatically at the predetermined lower level. Clearly, any desired member of sets of stop dogs 281 may be provided and secured in predetermined adjusted positions on the respective brackets 279 for use sequentially in laying successive courses.

The two stop switches 282 are operatively connected to actuate solenoid valves 283 respectively, the left one of which is connected in the conduit 273 leading to the lower end of the left cylinder 125 and the other of which is connected in the conduit 277 leading to the lower end of the right cylinder 125. When either of the solenoid valves 283 is energized through closing of the associated stop switch 282 by its stop dog 281, the valve closes to prevent further flow of hydraulic fluid into or out of the lower end of the associated cylinder 125, thereby locking the associated end of the strike-off 61 in the predetermined position and preventing further downward movement or sagging thereof. When the strike-off 61 is positioned automatically in this manner, the control system associated with each end thereof operates independently and not necessarily simultaneously in a manner to position each end of the strike-off precisely in accordance with the adjusted position of the associated stop dog 281.

Electrical energy for operating the strike-off positioning control system is derived from the generator 34 through a control circuit traced from the line conductor L1 that is connected by closing a normally open push button switch 285 with a branching conductor 286 leading to both of the normally open dog actuated stop switches 282. From the normally open stop switches 282, conductors 287 lead to the associated solenoid valves 283 which in turn are connected with a return conductor 288 that leads back to the line conductor L2. When the operator desires to position the strike-off member 61 in accordance with the settings of the stop dogs 281, he energizes the control circuit by closing the normally open push button switch 285 and then moves the strike-off member 61 by manipulating the hydraulic control levers 271 and 275. The respective ends of the strike-off member 61 then move in response to actuation of the control levers 271 and 275 until each is stopped independently by engagement of the selected stop dog 281 with the associated stop switch 282 which then closes to complete the circuit that energizes the associated solenoid stop valve 283. After both ends of the strike-off member 61 have been thus positioned, the operator may release the levers 271 and 275 to their neutral positions for locking the hydraulic circuits and then releases the push button 285 to de-energize the stop control circuit.

So long as the strike-off positioning control system remains de-energized by reason of the switch 285 remaining open, the strike-off member 61 may be moved up or down through manipulation of the control levers 271 and 275 with the stop dogs 281 passing the stop switches 282 without effect, since no current is available in the control circuit to close the solenoid valves 283. Accordingly, when the operator desires to lift the machine as previously explained, for positioning the supporting wheels or for any other purpose, he leaves the switch 285 open and manipulates the valve levers 271 and 275 to admit pressure fluid into the conduits 272 and 276 leading to the upper closed ends of the respective cylinders 125. This will cause the piston rods 126 to move downward and when the strike-off members 61 engage the ground or other supporting surface, the reaction within the cylinders 125 will operate to lift the trailing end of the machine.

As previously mentioned, the leading end of the machine is lifted by two other cylinders 127 and these are controlled by valves 291 and 292 in the middle of the valve bank 251 that are provided with control levers 293 and 294 respectively. The valve 291 may be actuated by its lever 293 to admit pressure fluid into a conduit 295 leading to the upper end of the left lifting cylinder 127. When in its other position, the valve 291 admits pressure to a conduit 296 that leads to the lower end of the left cylinder 127. In a like manner, the valve 292 is connected by a conduit 297 to the upper end of the right cylinder 127 and by a conduit 298 to the lower end of the right cylinder 127. When it is desired to lift the entire machine from the forms F for example, the respective ends of the strike-off member 61 and the shoes 129 on the piston rods 128 of the cylinders 127 may each be brought into firm contact with the supporting surface independently by manipulation of the various control levers 271, 275, 293, and 294. These four levers may then be operated simultaneously to effect equalized lifting action in raising the machine from the forms. When it is desired to lower the machine, the four levers may be actuated simultaneously in the other direction thereby supplying fluid to the lower ends of the four cylinders and withdrawing fluid from the upper ends thereof.

In order to avoid lowering the machine too rapidly each of the conduits 272, 276 and 295 and 297 leading from the upper ends of the four lifting cylinders is provided with a one-way flow restricting valve 299. These valves 299 are arranged to permit free flow of pressure fluid into the upper ends of the cylinders for unrestricted lifting of the machine but they automatically restrict outward flow of fluid from the upper ends of the cylinders to a predetermined slow rate. This results in limiting the speed at which the machine can be lowered from its jacked-up position, thereby obviating the possibility of acidentally dropping the machine too rapidly from the elevated position should the control valves 268, 269, 291 and 292 be opened too far in lowering the machine. When the machine is returned to its lowered position, the control levers 293 and 294 are further manipulated to withdraw the piston rods 128 into the forward cylinders 127 thereby lifting the shoes 129 to their elevated inactive positions. Likewise the control levers 271 and 275 are operated to position the strike-off member 61 either in its elevated inactive position or at one of its working positions as determined by the stop dogs 281 in the manner previously explained.

When these lifting and adjusting operations and the conveyer shifting and belt tensioning operations are completed, the several control levers and their associated valves of the valve bank 251 are all returned to their neutral positions, whereupon hydraulic fluid flowing from the pump 245 through the conduit 248 now flows freely through the valves of the valve bank 251 and escapes at low pressure through the return conduit 252 to the reservoir 246. Accordingly, the pump 245 then operates to criculate fluid through the valve bank 251 at minimum pressure and with little effort until such time as one or another of the valves in the bank 251 is actuated. When this occurs, the pressure in the conduit 248 builds up to that required in order to effect the desired operation of the particular hydraulically operated element of the machine that is being controlled by the actuated valve, the maximum pressure being limited by the predetermined setting of the relief valve 249.

From the foregoing description of exemplary concrete placing apparatus set forth herein, and the explanation of its mode of operation, it will be apparent that the present invention has provided a new method of and improved apparatus for distributing and placing concrete in plastic condition to form a pavement slab. The improvement in placing concrete is accomplished by causing a stream of plastic concrete to flow transversely across the slab site and then intermittently diverting the stream by plowing it periodically in direction opposite to its direction of flow. In this manner, the flowing stream of plastic concrete is diverted onto the site in the form of successive transverse strips of uniform thickness that blend into and merge with the advancing end of the slab being formed. When placed in this manner, the plastic concrete on the slab site is maintained at a constant hydrostatic head and of uniform consistency and degree of consolidation while being molded into position. This results in maintaining the plastic material of uniform density throughout and obviates unequal subsidence as the material sets and cures.

Although specific examples of concrete placing equipment illustrative of the present invention have been set forth in considerable detail by way of a full disclosure of a practical and useful embodiment of the invention, it is to be understood that other arrangements of the apparatus and different proportional relationships of the elements as well as of driving and controlling mechanism may be utilized by others familiar with the art of laying pavements without departing from the spirit and scope of the invention as defined in the subjoined claims.

Exemplary embodiments of the invention having now been fully described, we claim as our invention:

1. In a concrete spreader for placing concrete in laying a slab of pavement or the like, a spreader frame arranged to travel along the site of a pavement slab being laid, a conveyer supporting gantry structure positioned transversely of the slab being laid and movably mounted on said spreader frame for endwise adjustment relative thereto, said gantry being longer than the width of the pavement slab being laid and adapted to project over either or both edges of the slab site to receive plastic concrete, power operated means to move said gantry endwise on said frame to position its projecting ends selectively relative to the slab being laid for receiving concrete delivered at the side of the slab site, belt pulleys rotatably mounted at each end of said conveyer gantry respectively, a conveyer belt trained to run over said pulleys to convey plastic concrete transversely of the slab being laid, power operated means mounted on said movable gantry and connected to drive one of said belt pulleys in either direction selectively and thereby drive said conveyer belt regardless of the position of said gantry relative to said frame, a plow movably mounted on said gantry in position to plow plastic concrete from the upper run of said conveyerbelt to deposit it on the site of the pavement slab being laid, power operated means mounted on said movable gantry and connected to move said plow along said belt in either direction selectively, and control apparatus operatively connected to said plow moving power means and arranged to control movement of said plow in a manner to place the plastic concrete plowed from said belt on the site in a strip extending transversely of the pavement slab being laid.

2. In a spreader for spreading concrete in plastic condition to form a pavement slab, a spreader frame adapted to span and to progress along the site of a slab of pavement being laid, a conveyor gantry disposed transversely of the site of the pavement slab being laid and carried by said spreader frame for adjusting movement endwise therein in direction across the slab, belt pulleys rotatably mounted at the respective ends of said conveyer gantry in position to support a conveyer belt, power means carried by said movable gantry and operatively connected to turn at least one of said belt pulleys, a conveyer belt operating over said belt pulleys to convey concrete along said conveyer gantry transversely of said slab, a carriage movably mounted on said conveyer gantry for movement endwise thereof, power means carried by said gantry and operatively connected to move said carriage along said gantry, a backing plate carried by said carriage beneath and supporting the upper run of said conveyer belt, and a plow carried by said carriage above the part of said upper run of said conveyer belt supported by said backing plate in position to plow plastic concrete from said belt to form the pavement slab, the arrangement being such that said plow in moving along said conveyer belt as said frame progresses along the site, plows concrete from said belt to place it on the site in transverse ribbons that overlap to form the slab.

3. In a concrete spreader for placing concrete in laying a slab of pavement, a frame including spaced transverse members adapted to span the site of the slab of pavement being laid, longitudinal side members interconnecting said spaced transverse members in the region of the edges of the slab being laid, running gear disposed to support said frame for movement along the site of the slab being laid, a conveyer supporting girder structure movably supported by said frame side members between said transverse members for endwise adjustment thereon, a conveyer mounted on said conveyer girder for transporting plastic concrete transversely of the slab being laid, power operated driving mechanism mounted on said movable girder and operatively connected to drive said conveyer, means to adjust said conveyer supporting structure endwise relative to said frame to extend the one or the other end thereof for receiving plastic concrete at the one or the other side of the slab being laid, a plow movably mounted on said girder structure and operatively arranged to divert plastic concrete from said conveyer, and power operated driving means mounted on said movable girder structure and operatively connected to move said plow along said girder in a manner to divert the plastic concrete from said conveyer and place it in the form of a strip extending transversely of the slab site, whereby the pavement slab may be formed of successively placed overlapping transverse strips of plastic concrete as the spreader moves along the slab site.

4. In a placing and spreading machine for distributing plastic material to form a pavement slab, a main frame adapted to extend over and move along a site being paved, a bridging gantry movably mounted for endwise adjustment on said main frame and extending transversely of the site being paved said gantry being substantially longer than the width of the pavement slab being laid and adapted to extend at either side of the slab site selectively through endwise adjustment on said main frame, a conveyer operatively mounted on and movable with said gantry, said conveyer being adapted to receive plastic paving material at the extending end of said gantry and to convey the material transversely over the site being paved, means to divert the plastic paving material from said conveyer onto the site being paved, and power actuated adjusting means to move said gantry and its associated conveyer endwise relative to said main frame, whereby the extending material receiving end of said conveyer may be retracted endwise by power to permit a vehicle to pass near said main frame, said conveyer then being extended endwise by power from said main frame to a position behind the vehicle to receive plastic paving material dumped from the rear of the vehicle for distributing it upon the site.

5. In a placer for distributing plastic concrete, a conveyer supporting structure in the form of a girder adapted to extend horizontally over a site to be covered by concrete, a carriage arranged to operate along said conveyer supporting girder structure, a top plate carried by said carriage and extending from side to side thereof across the top of said conveyer supporting structure, a side plate carried by said carriage and extending downward from one edge of said top plate along the corresponding side of said conveyer supporting structure, a conveyer belt arranged to run along the top of said conveyer supporting structure in a manner to pass over and be supported by the top of said top plate to convey plastic concrete over the site to be covered, a plow carried by said carriage above the section of said conveyer belt supported by said top plate in position to cooperate therewith to divert the plastic concrete from said conveyer belt in the direction to cause it to flow down said side plate onto the site being covered by concrete, and means to move said carriage along said conveyer supporting structure to cause the diverted plastic concrete to be placed on the site as a strip extending generally longitudinally of said conveyer supporting structure.

6. In a spreading machine for placing plastic concrete to form a pavement slab, a conveyer bridge adapted to extend transversely of a pavement slab being laid, means to advance said bridge along the slab, a conveyer on said bridge arranged to convey plastic concrete therealong from the one side toward the other side of the slab, a plow movably mounted on said conveyer bridge, reversible power operated means operatively connected to move said plow along said conveyer bridge alternatively in opposite directions in a manner to divert plastic concrete from said conveyer thereon and deposit it in successive transverse strips to form the pavement slab as said bridge advances, limit switches disposed on said bridge in positions to be engaged by said plow at the respective ends of its excursion of movement along said bridge, an electrical reversing control system interconnecting said limit switches and said reversible power operated plow moving means and operative in response to actuation of either of said limit switches through engagement thereof by said plow to reverse said power operated plow moving means thereby effecting automatic cycling of said plow, and a manually actuated switch operatively connected with said electrical reversing control system and operative selectively thereon to start said reversible power operated plow moving means in either direction thereby to initiate automatic cycling of said plow under control of said limit switches, said manually actuated switch serving also to reverse said plow selectively independently of said limit switches and including control means operatively connected for actuation selectively to deenergize said power operated means to stop said plow.

7. In a spreading machine for placing plastic concrete to form a pavement slab, a bridging member adapted to span the site of the slab being formed, running gear arranged to support said bridging member for movement along the slab site, a substantially flat load supporting member carried by said bridging member and extending therealong transversely of the slab site, a substantially vertical apron depending from the forward edge of said load supporting member and extending therealong, a strike-off member adjustably mounted along the lower edge of said depending apron for striking off plastic concrete on the site to form the pavement slab, a conveyer including an endless belt trained along said bridging member with its upper run extending along and supported upon said flat load supporting member in a manner adapted to carry plastic concrete therealong transversely of the site of the slab, and a plow movably mounted for reciprocatory excursions along said bridging member in cooperative relationship with the upper surface of said upper belt run to plow plastic concrete therefrom in forward direction toward and down said depending apron onto the site in front of said strike-off member, the arrangement being such that plastic concrete loaded onto said belt is carried thereby over the slab site and is plowed from said belt to slide down said apron onto the site where it is struck off by said strike-off member to form the pavement slab as the spreading machine advances along the slab site.

8. In apparatus for placing plastic concrete in laying a pavement slab between temporary spaced parallel forms, a vehicle including a frame adapted to span the pavement slab being laid and arranged to run on the side forms, a placing belt conveyer disposed transversely of the side forms on said frame in position to span the pavement slab being laid and arranged to convey plastic concrete from the one to the other side of the slab between the forms, means to discharge plastic concrete along one side of said belt conveyer from end to end thereof into the space between the side forms to constitute the pavement slab being laid, a second belt conveyer supported at one end on said frame in position to deliver plastic concrete to said transverse belt conveyer, and means to support the other end of said second belt conveyer directly upon the adjacent side form in position to receive plastic concrete for placing between the forms.

9. In a spreading machine for placing plastic concrete to form a pavement slab, a frame arranged to span and to move along the site of the slab being formed, a conveyer carried by said frame in position to convey plastic concrete transversely of the slab site, means to divert plastic concrete from said conveyer onto the slab site, a strike-off blade movably mounted on said frame in position to strike off and level the plastic concrete diverted from said conveyer to form the slab as said machine moves along the site, power actuated means operatively connected between said movable strike-off blade and said frame to raise or lower said strike-off blade selectively to regulate the thickness of the pavement slab being formed, said power actuated means serving also to lift said machine frame through exerting force downward upon said strike-off blade when it is lowered into contact with the ground, and a transportation wheel movably mounted on said frame for movement between storage position and transporting position thereon and adapted to be moved into transporting or storage position when said frame is lifted by action of said power actuated strike-off blade lowering means.

10. In a machine for spreading concrete in plastic condition to form a pavement slab, a frame arranged to extend over and to move along the site of a slab of concrete pavement being formed, means to spread the plastic concrete including a strike-off blade movably carried by said frame in position to strike off and level the plastic concrete to form the slab as said machine advances along the site, power actuated means operatively connected between said movable strike-off blade and said frame to exert force to raise or lower said strike-off blade selectively, means to control said power actuated means to position said strike-off blade at a desired elevation for regulating the thickness of the pavement slab being formed, said control means being operative also to cause said power actuated means to exert force downward upon said movable strike-off blade after it has been lowered into contact with the ground thereby to lift said machine, and a transportation wheel movably mounted on said frame for movement between transporting and storage positions, whereby said transportation wheel may be moved into or out of transporting position while said machine is lifted from the ground by said power actuated means operating through said strike-off blade.

11. In a machine for spreading concrete in plastic condition to form a pavement slab, a frame of generally rectangular form arranged to extend over and to move along the site of a slab of concrete pavement being formed, means to spread the plastic concrete including a strike-off blade movably mounted for vertical adjustment on said frame adjacent to its trailing end and in position to strike off and level the plastic concrete to form the slab as said machine advances along the site, power actuated means operatively connected between said movable strike-off blade and said frame to exert force to raise or lower said movable strike-off blade selectively, means to control said power actuated means to position said strike-off blade vertically for regulating the thickness of the pavement slab being formed, said control means being operative also to cause said power actuated means to exert force downward upon said strike-off blade after it has been lowered into contact with the site to lift the trailing end of said machine above its operating position, a power actuated lifting jack carried by said frame adjacent to its leading end and operative to exert force downward upon the site to lift the leading end of said machine, and transportation wheels movably mounted on said machine frame for movement between transporting and storage positions thereon, whereby said transportation wheels may be moved into or out of transporting position while said machine is lifted above its operating position by said power actuated lifting means.

12. In a spreader for concrete, a frame adapted to extend over and move along a site being paved, a belt conveyer including an endless belt mounted on said frame in position to extend transversely of the site being paved and adapted to convey concrete on its upper run, a carriage movably mounted on said frame for movement longitudinally of said belt conveyer, a backing plate on said carriage disposed beneath the upper run of said belt to support it, a plow on said carriage disposed to plow concrete from the supported part of the upper run of said belt as it passes over said backing plate, an apron depending from said backing plate at the edge of said belt from which the concrete is plowed, and a chute secured on said apron in position to receive and distribute concrete descending from said plow as said carriage moves along said belt conveyer, the arrangement being such that said chute places the concrete in successive ribbons transversely of the site being paved as said frame moves along it.

13. In a concrete spreader for placing concrete in laying a slab of pavement, a frame adapted to span the site of the slab of pavement being laid, running gear supporting said frame for movement along the site of the slab being laid, a conveyer carrying structure movably supported for endwise adjustment by said frame in position to span and extend beyond the sides of the slab site, a reversible conveyer mounted on said movable conveyer carrying structure for transporting plastic concrete in either direction transversely of the site of the slab being laid, power operated conveyer driving mechanism mounted on said movable conveyer carrying structure and operatively connected to drive said conveyer in either direction selectively, power operated means to adjust the position of said conveyer carrying structure endwise relative to said frame to extend the one or the other end thereof for receiving plastic concrete at the one or the other side of the slab being laid, a reversible plow movably mounted on said conveyer carrying structure, said plow being operatively arranged for adjustment to divert plastic concrete from said conveyer when moving thereon in either direction, and power operated plow driving means mounted on said movable conveyer carrying structure and operatively connected to move said plow along said structure in direction opposite to the direction of movement of said conveyer in a manner to divert the plastic concrete from said conveyer in the form of successively placed strips extending transversely of the slab site as said spreader moves along the site, whereby plastic concrete may be supplied to said concrete spreader from either side of the site for placement thereby in overlapping transverse strips integrated into the advancing end of the slab being formed.

14. In a speader for placing plastic concrete, a conveyer girder adapted to extend over the site of placement, a conveyer arranged to operate along said girder to convey plastic concrete therealong for placing it in position on the site of placement, a carriage arranged to move along said conveyer girder, means on said carriage arranged to divert plastic concrete from said conveyer onto the site of placement, and a spreader plate hingedly depending from said carriage in position to engage and spread the plastic concrete placed on the site as said carriage moves along said conveyer girder, said spreader plate being so hinged that it swings downward in a manner to engage and push along the plastic concrete as said carriage moves in one direction and when said carriage moves in the other direction said plate swings upward and drags along the surface of the plastic concrete.

15. In a spreader for concrete, a frame adapted to extend over and to move along a site being paved, a belt conveyer including an endless belt mounted on said frame in position to extend transversely of the site being paved and arranged to convey plastic concrete on the top of its upper run, a carriage movably mounted on said frame for movement longitudinally of said belt conveyer, a backing plate on said carriage disposed beneath the upper run of said belt to support a segment of it, a plow on said carriage disposed to plow concrete from the supported segment of the upper run of said belt as it passes over said backing plate, and an apron depending from said backing plate at the edge of said belt from which the concrete is plowed, said apron serving to guide concrete descending from said plow as said carriage moves along said belt conveyer, the arrangement being such that said plow places the concrete in successive ribbons transversely of the site being paved as said spreader moves along the site.

16. In a concrete spreader for placing plastic concrete to form a pavement slab, a belt conveyor including an endless horizontally running belt arranged to extend over the slab being formed and adapted to convey plastic concrete on its upper run, a movable carriage arranged to operate longitudinally along said belt conveyer, a horizontally disposed backing plate mounted on said carriage in position to extend beneath the upper run of said belt in manner to support the adjacent segment of said belt, a plow mounted on said carriage in position to extend over the segment of said belt that is supported by said backing plate said plow being arranged to cooperate with and divert plastic concrete laterally from the supported segment of said belt as said belt passes over said backing plate, and power operated means arranged to move said carriage together with said backing plate and said cooperating plow along said belt conveyor in manner to plow plastic concrete from said horizontally running belt progressively, whereby the plastic concrete diverted from said conveyer belt by said moving plow may be placed upon the site of the pavement slab in the form of successive transverse strips as said spreader advances along the site.

17. In a machine for spreading concrete in plastic condition to form a pavement slab, a frame arranged to extend over and to move along the site of a slab of concrete pavement being formed, means to spread the plastic concrete diverted from said conveyer belt by said movably mounted for vertical adjustment on said frame in position to strike off and level the plastic concrete to form the slab as said machine advances along the site, power actuated means operatively connected between said blade and said frame and adapted to exert force to raise or lower said movably mounted strike-off blade selectively, limit switches interposed between said blade and said frame and operatively connected to said power actuated means in manner arranged to control said power actuated means to position said strike-off blade on said frame at a desired elevation for regulating the thickness of the pavement slab being formed, and a manually actuated switch operatively connected to said power actuated means and operative selectively to override said limit switches to effect lowering of said strike-off blade into contact with the ground and to cause said power actuated means to exert force downward upon said movable strike-off blade after it has been lowered into contact with the ground thereby to lift said machine.

References Cited in the file of this patent

UNITED STATES PATENTS

| | | |
|---|---|---|
| 1,993,656 | Gardiner | Mar. 5, 1935 |
| 2,099,071 | Lundbye | Nov. 16, 1937 |
| 2,280,234 | Harvey | Apr. 21, 1942 |
| 2,318,872 | Madeira | May 11, 1943 |
| 2,439,620 | Faber | Apr. 13, 1948 |
| 2,779,508 | Ensinger | Jan. 29, 1957 |
| 2,848,930 | Thompson | Aug. 26, 1958 |
| 2,960,208 | Sibley et al. | Nov. 15, 1960 |
| 3,015,261 | MacDonald | Jan. 2, 1962 |

UNITED STATES PATENT OFFICE
CERTIFICATE OF CORRECTION

Patent No. 3,156,170                         November 10, 1964

William H. Behrens et al.

It is hereby certified that error appears in the above numbered patent requiring correction and that the said Letters Patent should read as corrected below.

Column 12, line 37, for "it" read -- its --; column 18, line 65, for "causes" read -- cause --; column 23, line 70, for "conveyerbelt" read -- conveyer belt --; column 26, line 13, after "parallel" insert -- side --; column 28, line 66, for "diverted from said conveyer belt by said" read -- including a strike-off blade carried by and --.

Signed and sealed this 13th day of April 1965.

(SEAL)
Attest:

ERNEST W. SWIDER                        EDWARD J. BRENNER
Attesting Officer                           Commissioner of Patents